US005971271A

United States Patent [19]

Wynn et al.

[11] Patent Number: 5,971,271
[45] Date of Patent: Oct. 26, 1999

[54] GAMING DEVICE COMMUNICATIONS AND SERVICE SYSTEM

[75] Inventors: Stephen A. Wynn; John Strzemp; Kenneth Lathrop; Ursula Conway; Rawle Findley; Laura May; Stephen Moore, all of Las Vegas, Nev.

[73] Assignee: Mirage Resorts, Incorporated, Las Vegas, Nev.

[21] Appl. No.: 08/876,122

[22] Filed: Jun. 24, 1997

Related U.S. Application Data

[60] Provisional application No. 60/020,727, Jul. 1, 1996.

[51] Int. Cl.[6] .......................... G06K 5/00; A63B 15/00; H04L 12/43

[52] U.S. Cl. .......................... 235/380; 463/42; 273/460

[58] Field of Search .......................... 235/380, 381; 463/40, 42, 43, 17, 18, 19, 20, 25, 29; 273/460, 461

[56] References Cited

U.S. PATENT DOCUMENTS

| | | | |
|---|---|---|---|
| 4,283,709 | 8/1981 | Lucero et al. | 340/217 |
| 4,636,951 | 1/1987 | Harlick | 364/412 |
| 5,249,800 | 10/1993 | Hilgendorf et al. | 273/138 |
| 5,259,613 | 11/1993 | Marnell, II | 273/138 A |
| 5,280,909 | 1/1994 | Tracy | 273/138 |
| 5,332,076 | 7/1994 | Ziegert | 194/217 |
| 5,429,361 | 7/1995 | Raven et al. | 273/138 |
| 5,470,079 | 11/1995 | LeStrange et al. | 273/138 |
| 5,480,158 | 1/1996 | Schulze et al. | 273/434 |
| 5,655,961 | 8/1997 | Acres et al. | 463/27 |
| 5,844,601 | 12/1998 | McPheely et al. | 348/143 |

*Primary Examiner*—Thien Minh Le
*Assistant Examiner*—Daniel Sherr
*Attorney, Agent, or Firm*—John E. Wagner

[57] ABSTRACT

A system for expanding the operation and play of gaming devices such as slot machines is disclosed. It employs an enhanced gaming device including an audio and a video channel between the gaming device and a central location manned by one or more concierges who can communicate with the player, answer questions, make reservations and, in general, attend to the requests of the player. Selected video displays under the control of the concierge are substituted for the normal video display such as a pay table at the gaming device. Communication is initiated by the player by lifting a handset, operating a call button or by inserting a club card into a card slot. Any of these actions will place the call in a queue for answering. If a club card was inserted, player data is displayed before a concierge and the player views an image of the concierge. Player requests may then be addressed. Other calls are likewise addressed. Machine malfunction, jackpot win and coin in/coin out data also trigger concierge response. A variety of locally controlled video presentations may be provided. The system includes video, audio and data communication and storage. Optionally, video communication from the player to the concierge is provided. In the event of a machine malfunction, the concierge is alerted and may request technician attention. Non club card initiation of communication are prioritized with club card system operation.

25 Claims, 23 Drawing Sheets

FIG. 19
RED
WHITE &
BLUE
WIN A LEXUS!
WITH 3RD COIN BET
1COIN
2ND COIN
3RD COIN
50 100 150
40 80 120
25 50 75
20 40 60
10 20 30
5 10 15
2 4 6
2 4 6
2 4 6
BLANK BLANK BLANK 1 2 3
ANY ANY ANY
80 160 240

GAMING DEVICE COMMUNICATIONS AND SERVICE SYSTEM

REFERENCE TO RELATED APPLICATION(S)

This application is a non provisional application based upon and claims the benefit of U.S. Provisional Application Ser. No. 60/020,727, filed Jul. 1, 1996.

BACKGROUND OF THE INVENTION

In the gaming industry, a vast majority of games involve multiple players in the same location. Often a representative of the casino or house is present with a number of players around a common table. There is regular interaction between the players and with the dealer or representative of the house.

A major and perhaps most popular form of gaming, however, remains the free standing gaming device such as a slot machine controlled manually by the player with payment or credits for amounts won less than a machine defined jackpot. Some players develop a possessive feeling with respect to a particular machine at a particular time and their only contact with other players is perhaps conversation with an adjacent player or with a cocktail waitress or change attendant. It is primarily a solo gaming activity.

The players are often reluctant to leave the machine for change or other reasons and in most cases, the house or casino has no knowledge of the players identity, time or amount of play or needs, desires, or location of the player.

One advance in providing information to the house or casino of the player's identity and amount and time and machine played is through the use of card clubs in which there is a card issued to a player, usually at no cost, and a card slot in the gaming device which the player inserts providing identity of the player and the machine and time and amount of play. The card club is usually used to provide bonuses and incentives to the regular and major players of the gaming devices. This has opened the door to the knowledge of which player plays which machines and how much play in return for certain house benefits. The system providing for such communication is available from International Gaming Technology, Inc. of Reno, Nev. as their slot club player tracking system or other similar systems such as produced by Casino Data Systems, Inc. of Las Vegas, Nev.

In progressive play gaming devices, there has been developed intergame data transfer to the extent that multiple machine play can result in progressive jackpots and provide an incentive for players to participate in the progressive jackpot. Examples of such systems are disclosed in the following U.S. Patents:

| | | |
|---|---|---|
| 5,249,800 | Hilgendorf et al | October 5, 1993 |
| 5,280,909 | D.A. Tracy | January 25, 1994 |

One attempt to encourage a player to remain at a machine by providing entertainment TV while playing is disclosed in the following U.S. Patent:

| | | |
|---|---|---|
| 5,259,613 | A.A. Marnell, II | November 3, 1993 |

Other patents providing a degree of data transfer between gaming devices and a central location are shown in the following patents:

| | | |
|---|---|---|
| 5,429,361 | Raven et al | July 4, 1995 |
| 5,470,079 | LeStrange et al | November 28, 1995 |

Still, the gaming device player constitutes a solo customer having very little interaction with his host.

BRIEF DESCRIPTION OF THE INVENTION

Faced with this state of the art, we have ascertained that it is possible to employ video communication techniques used for conferencing in combination with card club techniques to provide meaningful interactive human communication with any equipped gaming device. The end result is a teleconferencing gaming device. We can provide not only player and gaming device identification to the host organization, but also provide a communication channel between the player and a live concierge with the video image and voice of the concierge responding to the player's needs. This can be accomplished with the aid of video communications systems such as the system disclosed in U.S. Pat. No. 5,374,952 of D. P. Flohr issued Dec. 20, 1994.

We have added to the player's gaming device a number of features which are integrated into the device and are accessible to the player while playing. They include a telephone handset and a call button, either of which can be used for signaling the concierge, a microphone and loudspeaker for loudspeaking communication with the concierge and beyond, and a computer monitor for displaying formal gaming device pay tables and the concierge image while in communications mode and other displayed visual information. A video camera allows the player's image to be seen by the concierge for more meaningful communication. Unseen by the player but integrated into the gaming device are the necessary elements for providing the audio, video and data processing and communications to the central station and to the concierge.

The combination of the card club feature and the voice and video communication now make it possible for the concierge via video image and audio channel to greet the player, remind him of his card club bonus level and also solicit any of the needs of the player such as change, beverage, dinner reservations, or the like so the player has no need to leave the machine, nor interrupt his play. Likewise, solicitation for card club membership can be made via the channel in a courteous manner.

Jackpots which normally involve a flashing light and ringing bell locally at the machine can now be supplemented by involving a concierge simultaneously learning of such event and via the communications channel personally congratulating the player.

Given these capabilities and with player and machine identification, it is possible for the player to have virtually uninterrupted play if they so desire, be provided required services, and in the event of an equipment failure, the communications channel allows that failure to be detected and corrected much faster than methods available heretofore.

It is also possible with this system to provide telephone communication from the player at his machine to both internal to the casino or hotel and external via the house PBX.

The main objective of this invention is to provide customer service via video to the gaming device patronage. The scope of this invention involves the following:

VTC (video teleconferencing) integration between gaming devices and a Call Center;

Video integration from several sources, for example, local video files, laser discs, video server or live feed from the casino or hotel events;

Design of gaming devices to accommodate microcomputer components including a monitor which will be used to display videos, a concierge when a call is in progress, as well as the pay table, which was previously seen on the traditional fixed silk screened glass panel;

Selection and mounting of monitors with proper depth in order to maintain existing industry standards for gaming device/square footage ratios;

Selection of microcomputer components for gaming devices and microcomputers for the Call Center;

Design of electronic pay tables;

Queuing system to hold and process incoming and outgoing calls and maintain statistical information; and Interfacing with the slot marketing system to retrieve customer data.

The invention's primary benefits are as follows:

To enhance the overall customer experience by providing better, faster service to gaming device customers with a personal touch thereby ensuring a more satisfied customer;

Increase patronage to the slot club as a result of this invention;

Will enable us to better communicate promotions and services to customers;

Will be offering a new service not heretofore available; and

Increase playing time by reducing customers' need to leave gaming area.

BRIEF DESCRIPTION OF THE DRAWING

This invention may be more clearly understood with the following detailed description and by reference to the drawings in which.

DETAILED DESCRIPTION OF THE INVENTION

The features of this system as described above are provided in our preferred embodiment as described below.

Figure 16:
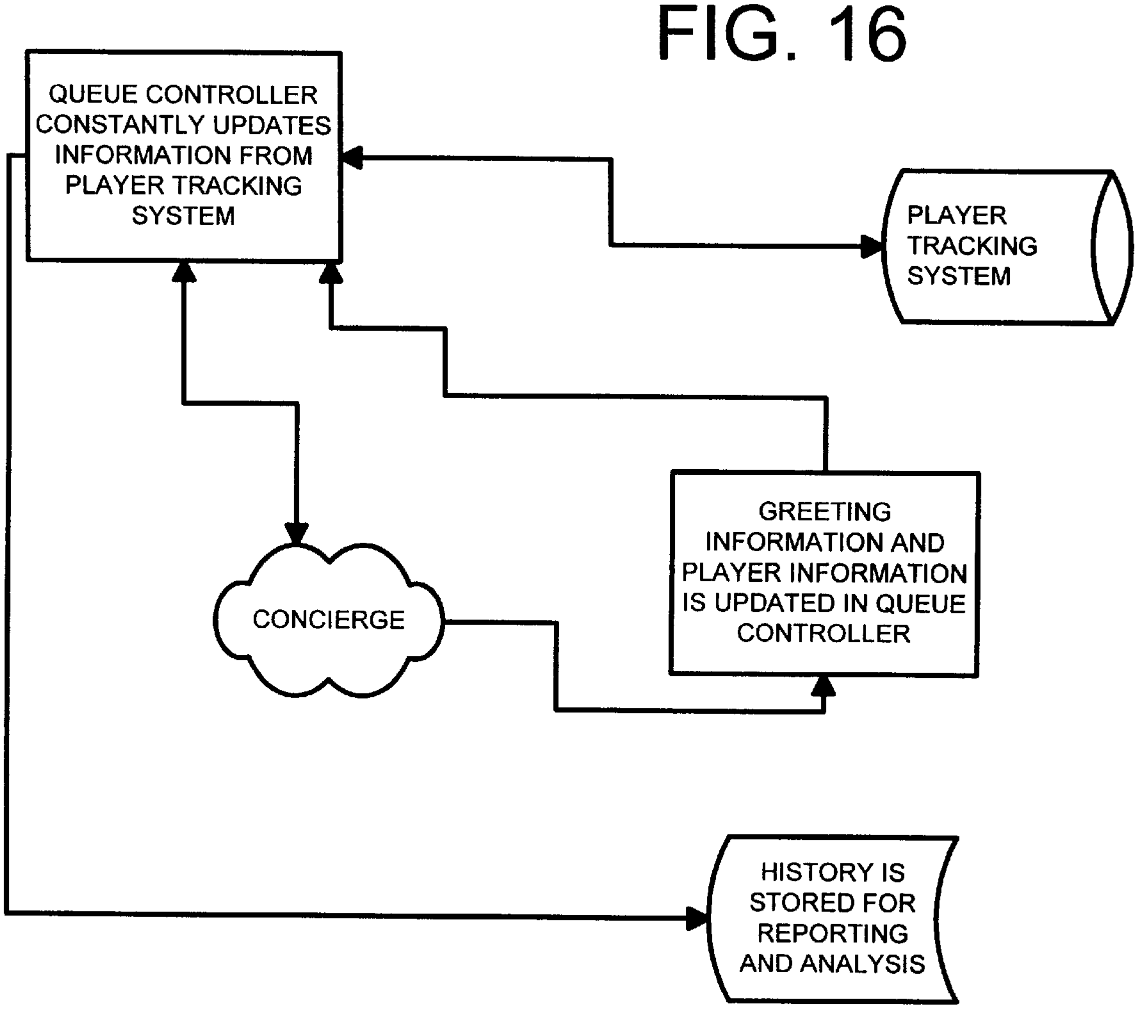
FIG. 16 is a flow diagram of the operation of the queue controller.
Figure 17:
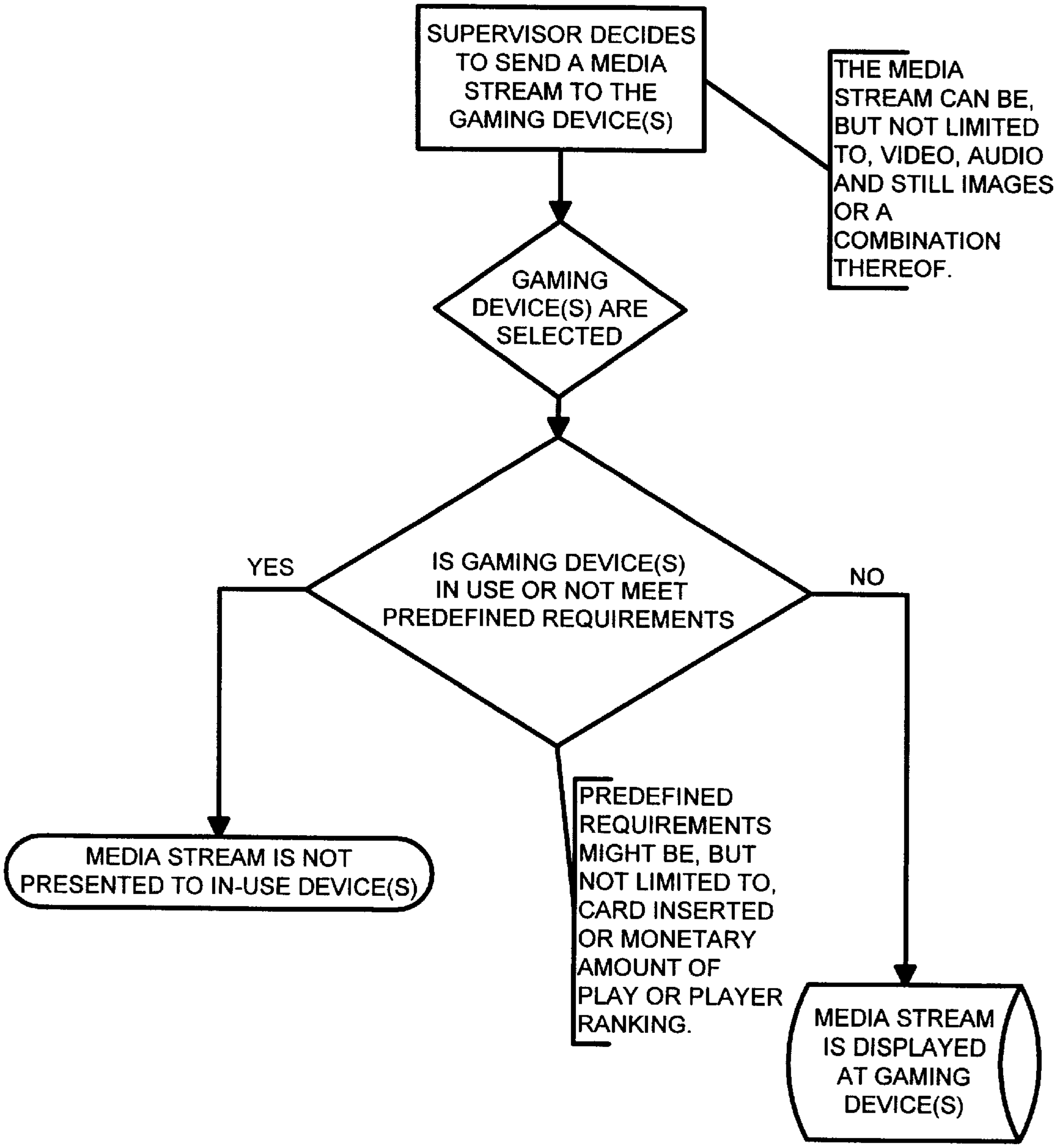
FIG. 17 is a flow diagram of the broadcast media stream of the system.
Figure 18:
FIG. 18 is a typical pay table.
Figure 19:
FIG. 19 is a typical view of a concierge as seen by a player during voice/video communication superimposed upon the typical pay table of FIG. 18.
Figure 20:
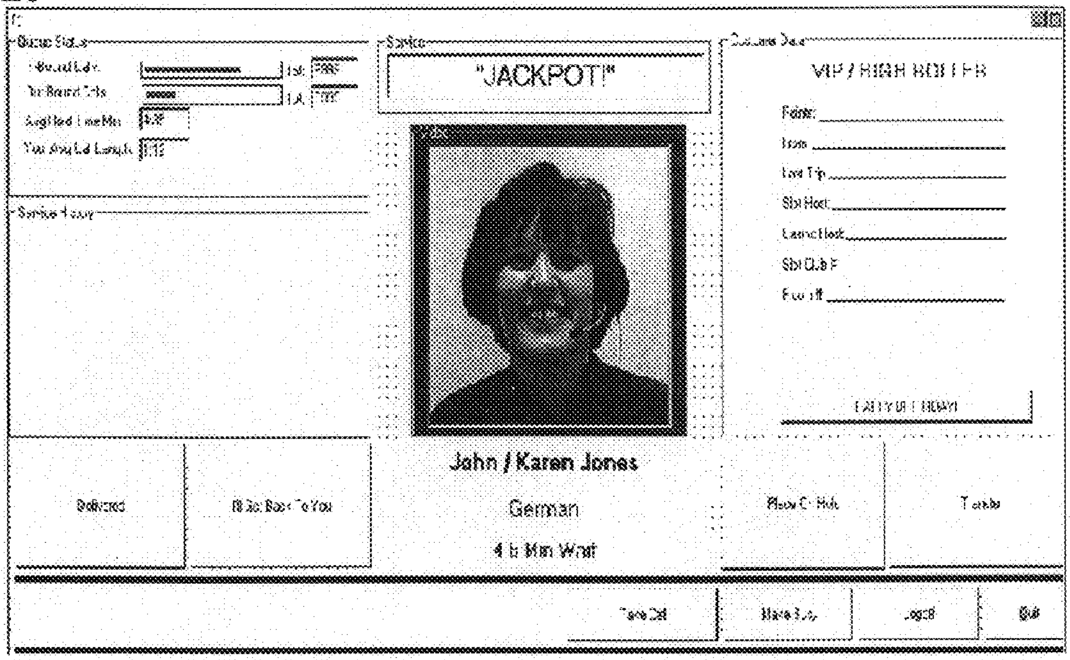
FIGS. 20 and 20A are typical screens as seen by the concierge during communication with a player congratulating the player on winning a jackpot.

For a further understanding of this invention, refer to FIGS. 1–7 in conjunction with flow diagrams FIGS. 8–17 and displays of FIGS. 18–20.

Figure 1A:
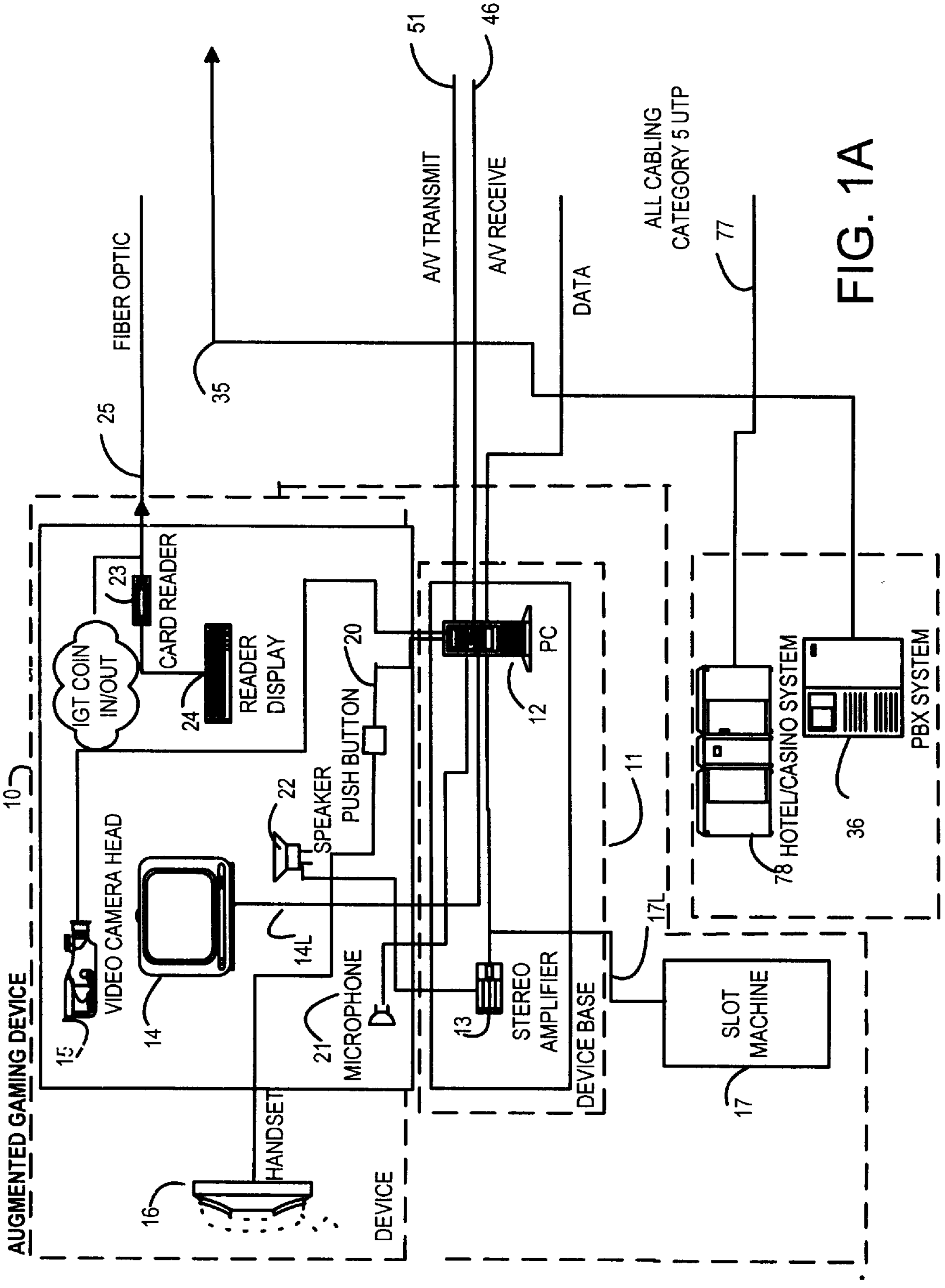
FIG. 1 is a system block diagram of this invention.
Figure 1B:
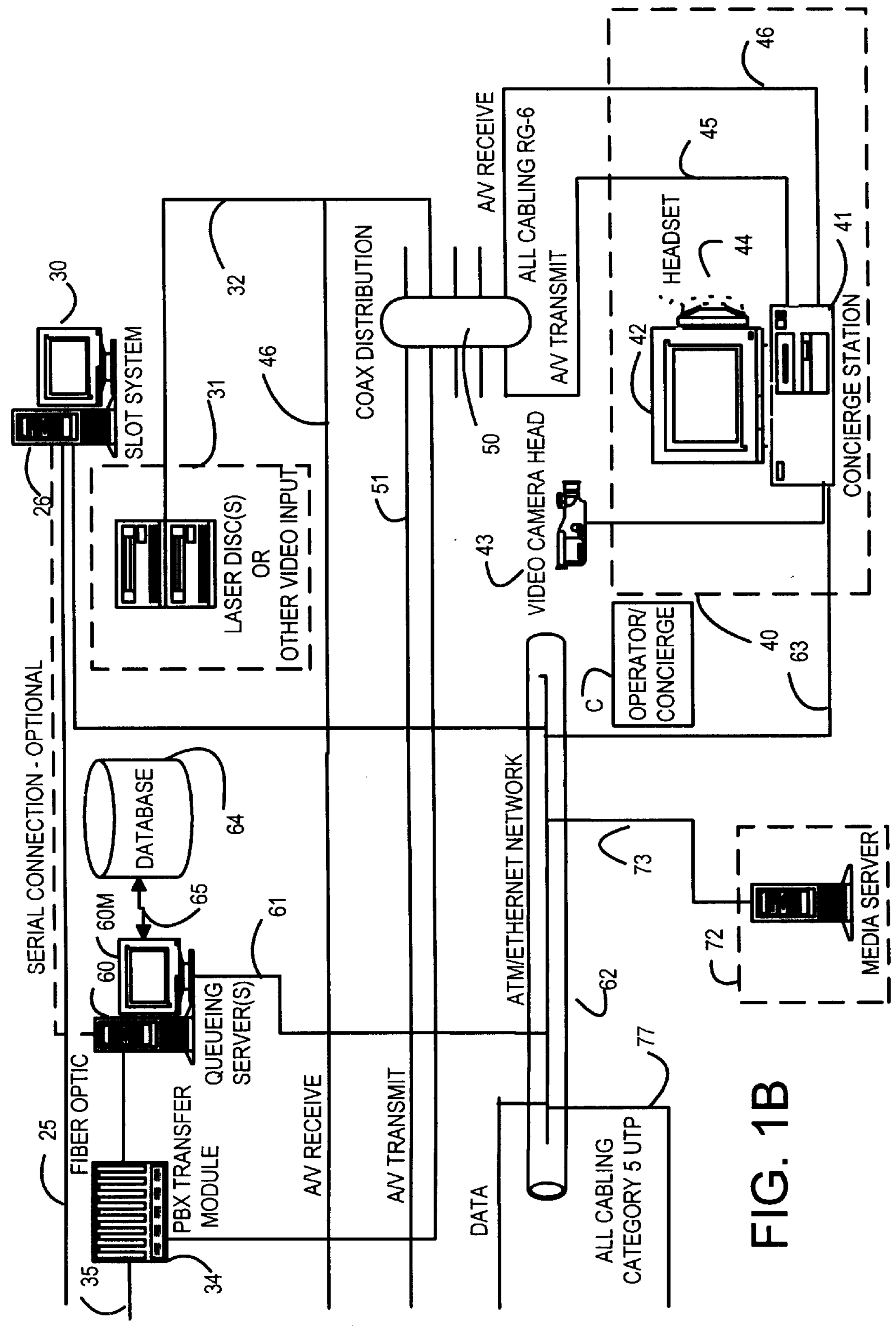
Figure 1C:
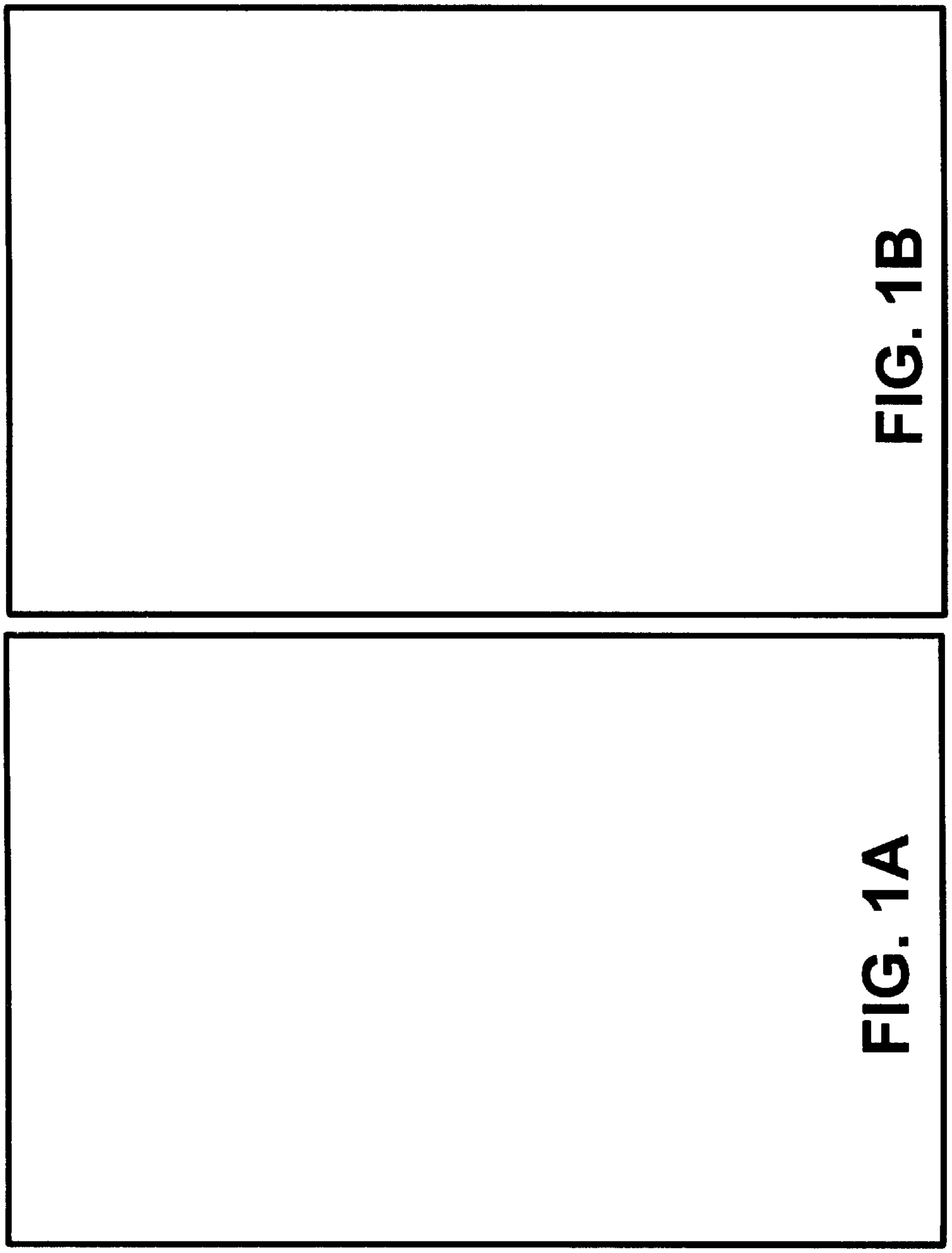

FIG. 1 is a block diagram of the system of this invention including an augmented gaming device including a communication system generally designated 10 which includes a basic gaming device 17 of the type already available in major casinos. The gaming device 10 of FIGS. 1 and 2 normally rests on a base 11 of FIG. 1 and that base houses portions of the system, including particularly a computer 12 and a stereo amplifier 13. The normal pay table screen of the gaming device 10 is replaced by a display of the type shown in FIG. 18 presented on a computer monitor 14. An optional video camera 15 directed toward the player's position may be placed at the player's station.

A conventional telephone handset 16 without keys is present at the player's station along with a call button 20, microphone 21 and speaker 22 which are used by any player with the call button 20 for speakerphone communication at the gaming device station 10 when the privacy of the handset 16 is not required. A player game card reader 23 and a game card display 24 complete the elements of the system at the gaming device 10.

The card reader 23 and the reader display 24 are coupled by a communication link, for example, a fiber optic cable 25 to a slot card information system generally designated 26 with its display monitor 30 at a central location away from the gaming device 10. The card reader 23 is used to read the club member's card to identify the player and at the same time has built-in reading capability to transmit the gaming device identification (I.D.) over line 25. Date and time information may optionally be generated at the gaming device or in the central location and added to the player information stored.

The card reader 23, display 24, fiber optic communication system 25, computer 26, and monitor 30 are the basic elements of the slot club player tracking system identified above.

The gaming device 17 is a conventional free standing machine with its normal internal fault detection systems which are designed to interrupt operation when a fault or an attempt to defeat the machine is detected. Added to the gaming device 17 is a diagnostic/fault communications line 17L to the gaming device computer 12. Typical information arriving on line 17L ready for transmission to the central station is:

a. door open;

b. out of coins;

c. tilt;

d. coin jam; or e. other failure.

Figure 2:
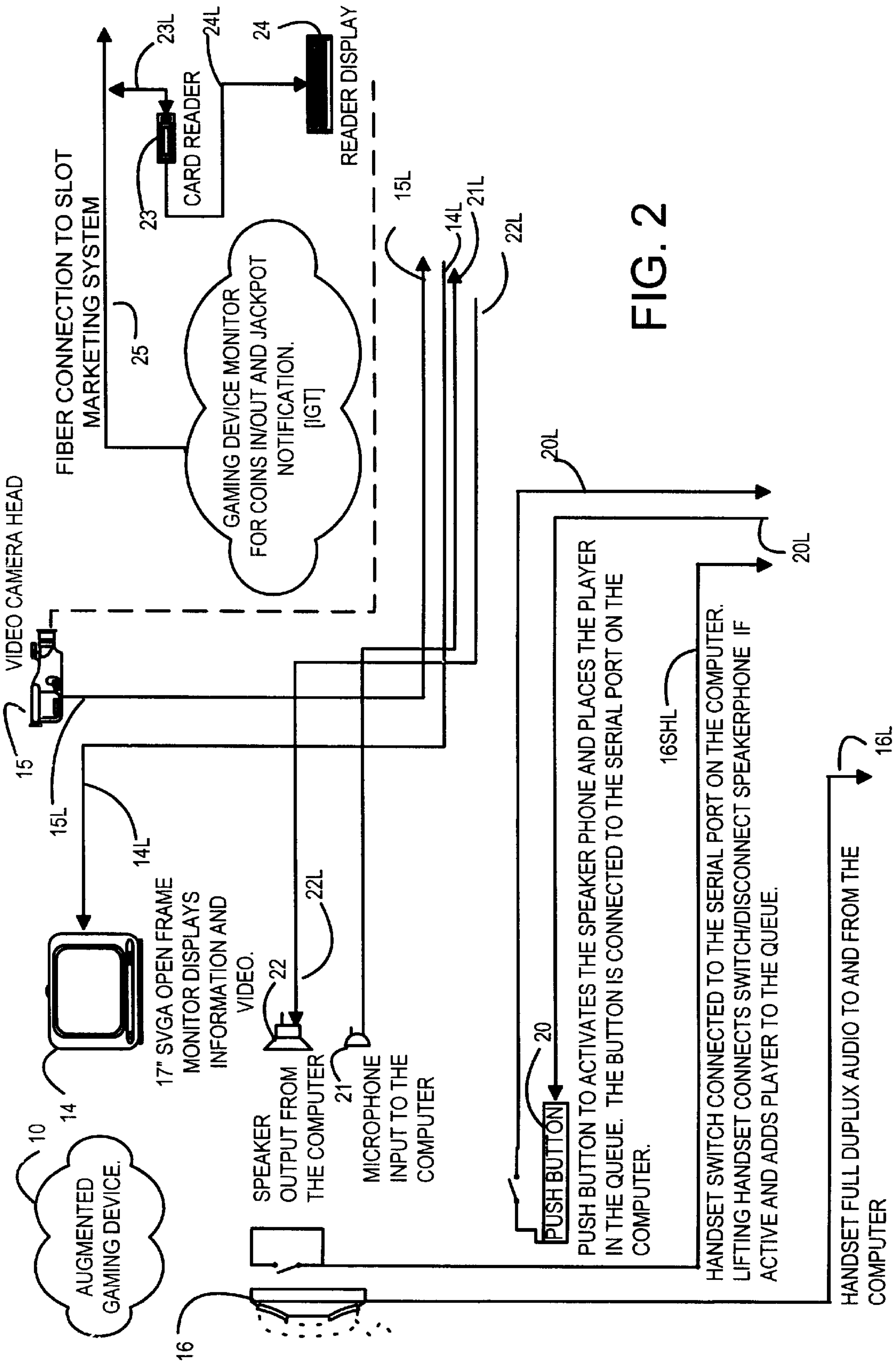
FIG. 2 is an enlarged block diagram of the gaming device portion of the system of FIG. 1 with the information flow identified.
Figure 3:
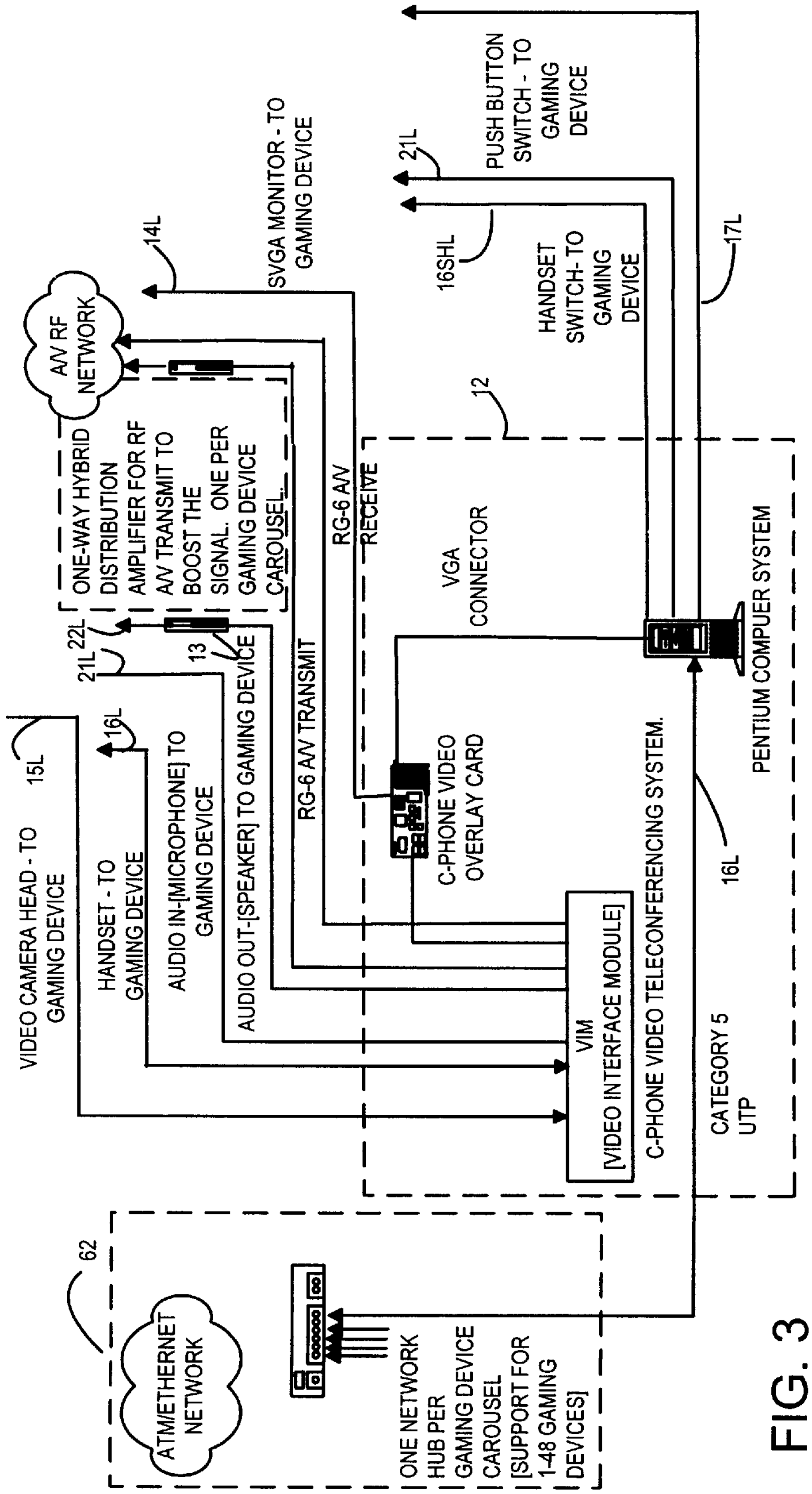
FIG. 3 is a block diagram similar to FIG. 1 of the gaming device base.

The system 10 adds machine identification (I.D.) to the player (I.D.) and information and machine diagnostics for forwarding from the central station to the repair service facility. If a concierge is available and a card club member is identified as playing that gaming device, the concierge may offer to be of assistance and apologize for any interruption. The IGT coin in/out capability of the card reader 23 of FIG. 1 and as indicated in FIG. 2 as a source for coins in/out and jackpot notification may be furnished by any number of gaming device monitoring systems as is well known in the gaming industry to meet gaming regulatory requirements. The IGT (International Gaming Technology, Reno, Nev.) SMART II system or similar type equipment of Casino Data Systems will suffice. At present, the IGT system is preferred.

Monitoring of coin in/out information on each augmented gaming device allows concierge contact with any gaming device based upon the current data acquired from any augmented gaming devices regardless of card insertion or not. This allows the concierge to congratulate a jackpot winner or other player who warrants assistance or greeting based upon the play data.

CONCIERGE STATION

Figure 4:
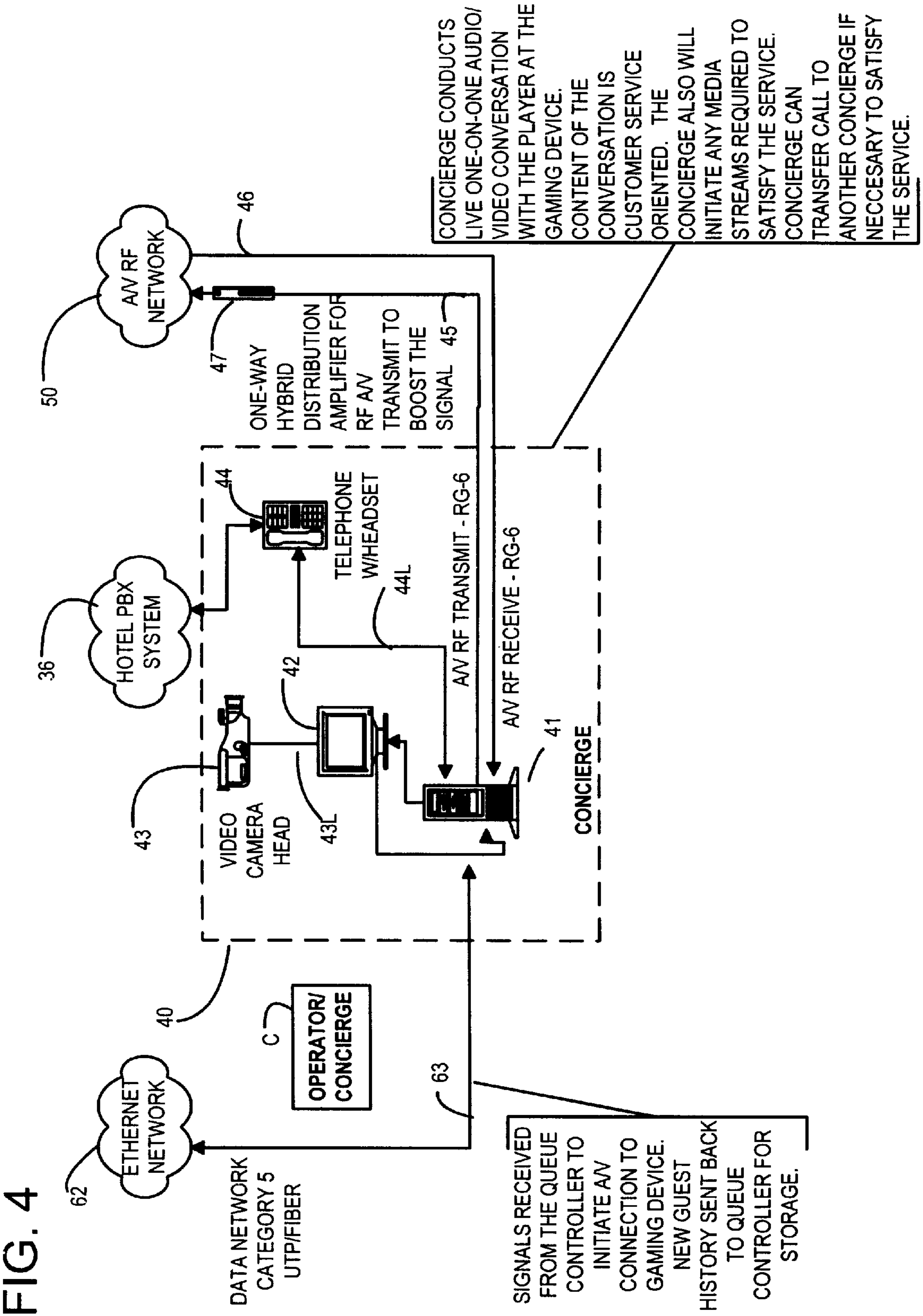
FIG. 4 is a block diagram of the concierge station of FIG. 1, similar to FIGS. 2 and 3.

At a central station or other location remote from all augmented gaming devices 10, a number of concierge or guest assistance personnel are located, each having their own station shown in FIGS. 1 and 4 including a computer 41, a monitor 42, a television camera 43 and an operator type headset represented here, simply as a telephone handset 44. The television camera 43 is located usually on top of the monitor 42 and directed to view the concierge C who is seated in front of the monitor 42 in view of the camera 43.

The concierge has an audio/video transmit line 45 which is coupled through a distribution system designated generally as 50 and coupled to any of a plurality of augmented gaming devices 10, for example, via the transmit cable 51. The gaming device 10 may be located anywhere that such a machine is desired. The concierge station 40 includes an audio/video receive line 46 which is likewise coupled through the distribution system to audio/video transmit lines 45 from station 10. The system includes a laser disc or other video source 31 connected via communication channel 32 selectively to the audio/video receive line 46 of each station 10.

The concierge station 40 and the audio/video/data communication channels provide the features of audio, video and data communication between the augmented gaming device 10, the player on the gaming floor and the concierge and data banks at a control station or central location.

The system also has communication capability via a PBX transfer module 34 to lead 35 to the casino or hotel PBX system 36. This allows the concierge to connect the player's handset 16 to any communication accessible via the PBX system 36. An example of such use would be to allow the player to contact his room while at the gaming machine 10. Reverse direction video communication from the player to the concierge is within the capability of the system complying camera 15 of FIG. 1, if it would be desired.

This system also includes a queuing computer 60 with its monitor 60M which is coupled via communication channel 61 to a data transmission cable generally designated 62 but accessible at the concierge station via channel 63. The queuing server 60 likewise has access to the SQL database memory 64 over line 65 which has stored in its memory such information as:

a. player name;

b. player address;

c. player points accumulated;

d. beverage preference; and e. hotel guest status.

Access to the hotel or casino reservation and general information computer designated 78 is available over lead 77 and cabling 62 and 63 to allow the player with the coordination and assistance of the concierge to make dinner and show reservations, room reservations and any other service available to the hotel/casino guest while at the gaming device 10 without significant interruption with play. The concierge has the ability to call back a player to confirm such events.

Player information and other data, e.g., event information, are stored in a server generally designated 60 which is accessible via lead 61 and the concierge station 40 over lead 63.

Optionally, the queuing server 60 may provide serial data to the slot system computer 26 over lead 27.

Each of the communication components present in the augmented gaming device 10 of this system are shown in FIG. 2 with the data and function carried out on each lead there identified with the line to each of the components identified by the component reference numeral followed by the letter L designating line. In the case of the telephone 16, the communication line is designated 16L and the switch hook line designated 16SHL.

Figure 20A:
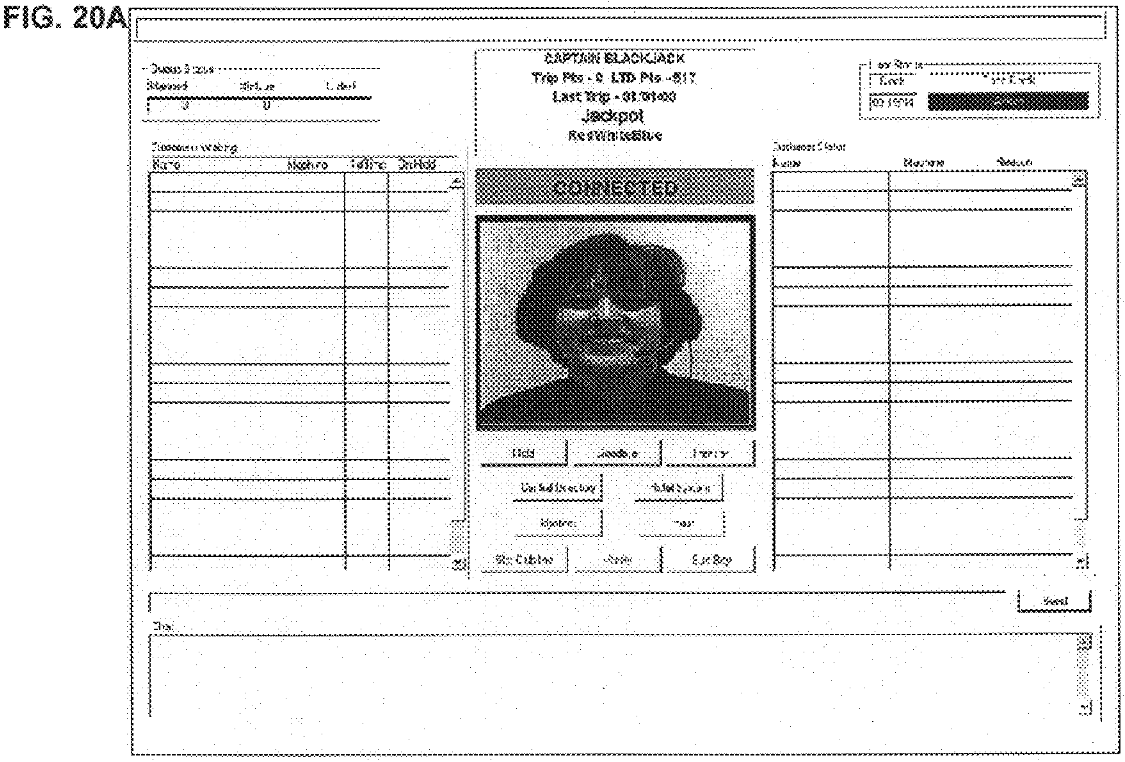

With the concierge station arrangement 40 of FIG. 4, the concierge C may maintain audio/visual communications with a player while accessing data from the data network and displaying pertinent data such as show information, reservation availability and player data on the concierge monitor to better allow the concierge to serve the player's requests. FIGS. 20 and 20A are illustrations of two types of multiple field displays as may be seen by a concierge C.

The preferred system of cabling is the ATM/Ethernet network although other types of digital networks such as FDDI type may be used.

ANALOG OUTPUT VIDEO SOURCES

Figure 5:
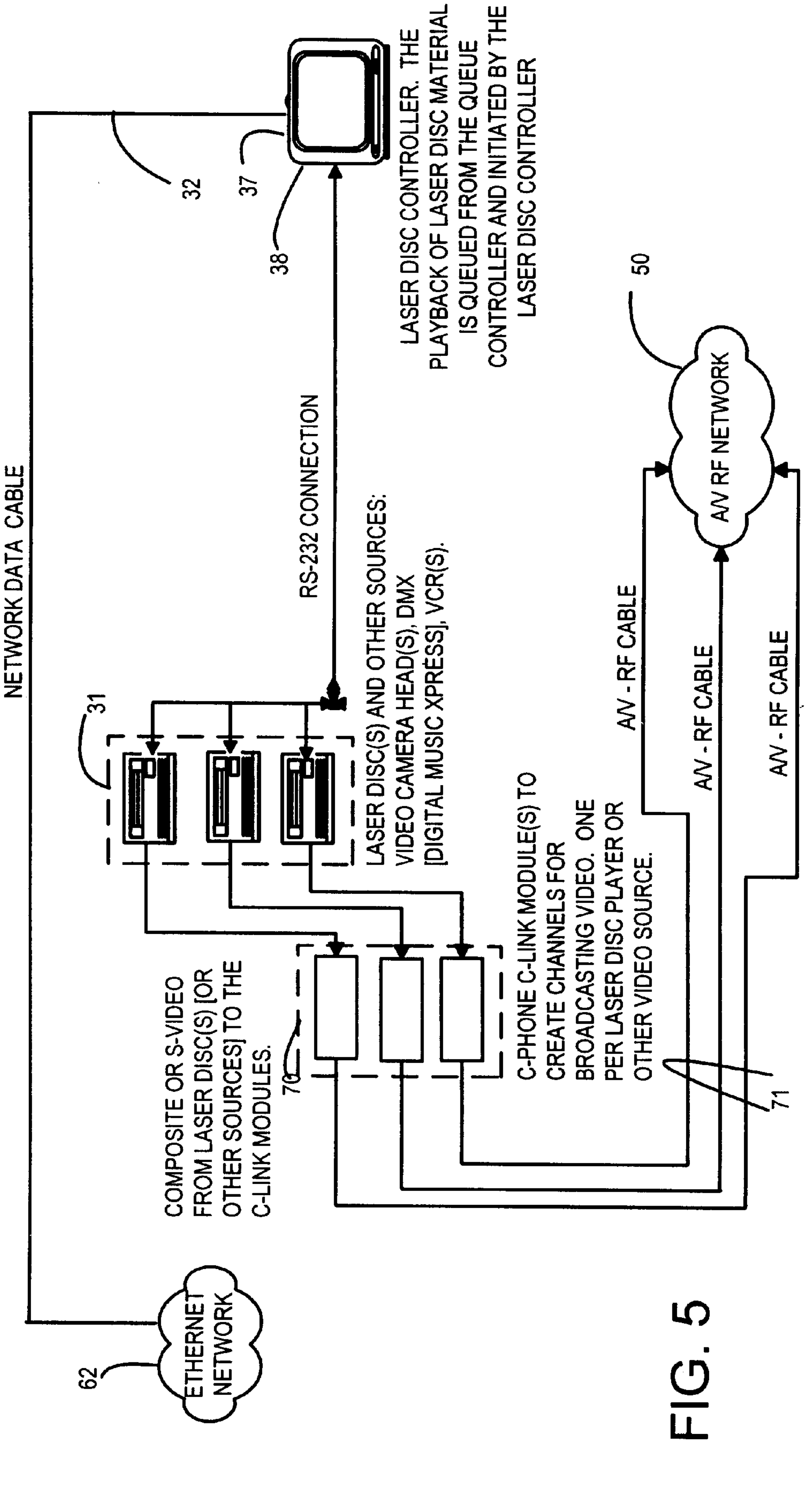
FIG. 5 is a block diagram of the analog output video sources shown in FIG. 1 with information flow indicated.

One source of video signals to be displayed on the player's monitor 14 and the concierge's monitor 42 is illustrated in FIG. 5. The laser disc drives 31 under the control of laser disc controller 38 with its monitor screen 37 allow the storage of a vast number of screens for display as needed or requested by the player. The card club commercial for display for non club members who use the handset 16 is a prime example. Previews of casino shows or other events are other examples. A number of audio/video communication links 70 couple the laser disc output signals to the A/V RF network 50 via the cables 71. Any data stored in the laser discs may be displayed on any of the augmented gaming devices as determined by the queue controller and transmitted via the network data cable 32 to the ATM/Ethernet Network 62.

DIGITAL VIDEO OUTPUT SOURCE

Figure 6:
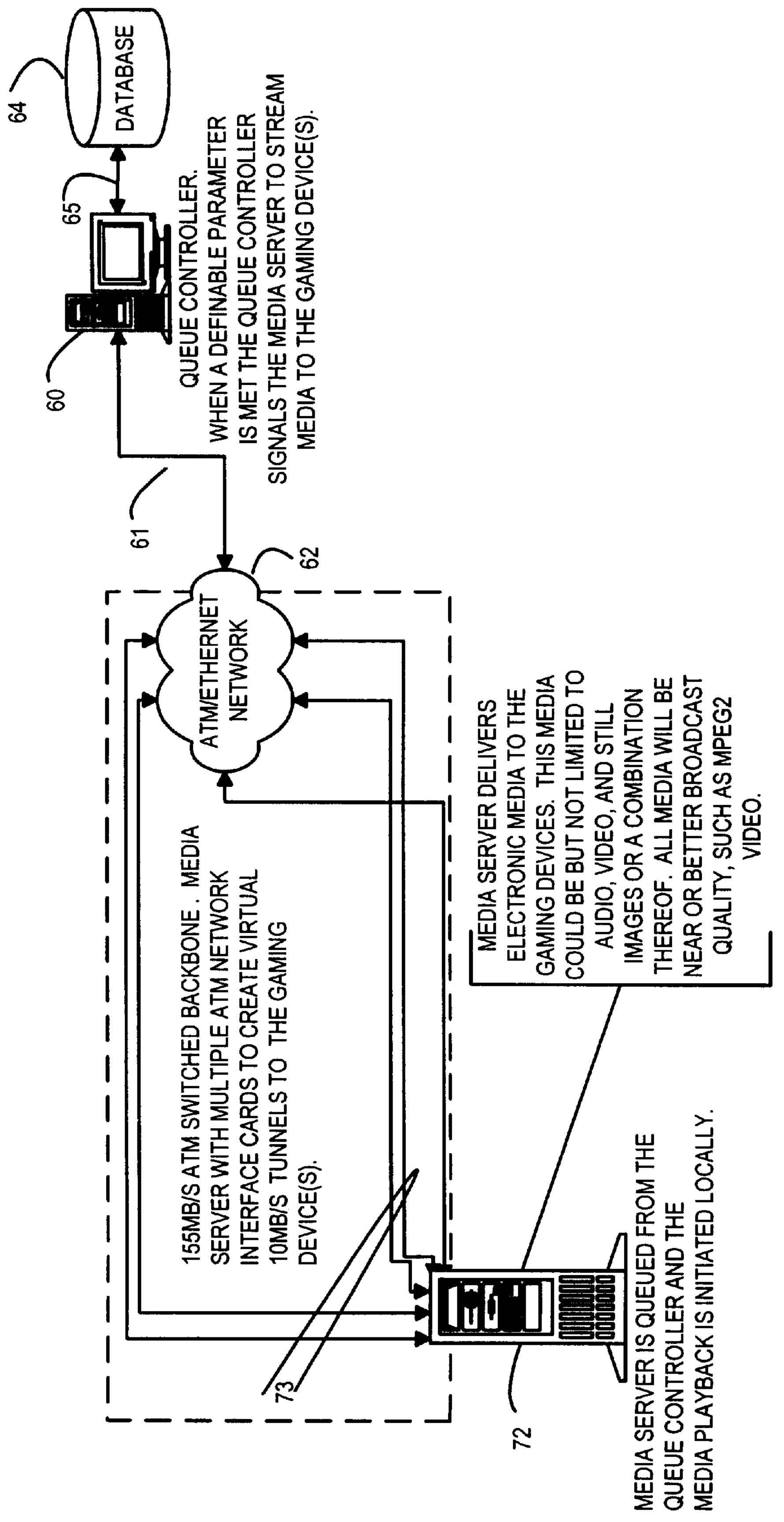
FIG. 6 is a block diagram of the digital output video sources of this invention.

Other sources of video signals to be displayed on the player's monitor 14 and the concierge's monitor 42 are illustrated in FIG. 6. The media server 72 of FIGS. 1 and 6 over lead 73 allows for the storage of a vast number of media clips for display as needed or requested by the player. The card club commercial for display for non club members who used the handset 16 is a prime example. Previews of casino shows or other events are other examples. These media clips are typically audio, video, and still images or a combination thereof. Leads 73 constitute a 155 Mb/s switched backbone data path media server 72 with multiple ATM network cards serves to create virtual 10 Mb/s tunnels to the augmented gaming devices 10. The media to be displayed is determined by the queuing controller 60 with input from the concierge. A vast number of media streams may be displayed at once through the ATM/Ethernet network 62 to the gaming devices 10.

The media server 72 is queued from the queue controller 60 and the media playback is initiated locally at the server 72. Media server 72 delivers electronic media to the gaming devices. This media could be but not limited to audio, video, and still images or a combination thereof. All media will be near or better broadcast quality, such as MPEG2 video. When a definable parameter is met, the queue controller 60 signals the media server 72 to stream media to the augmented gaming devices 10.

PLAYER CARD INTERACTION

Figure 7:
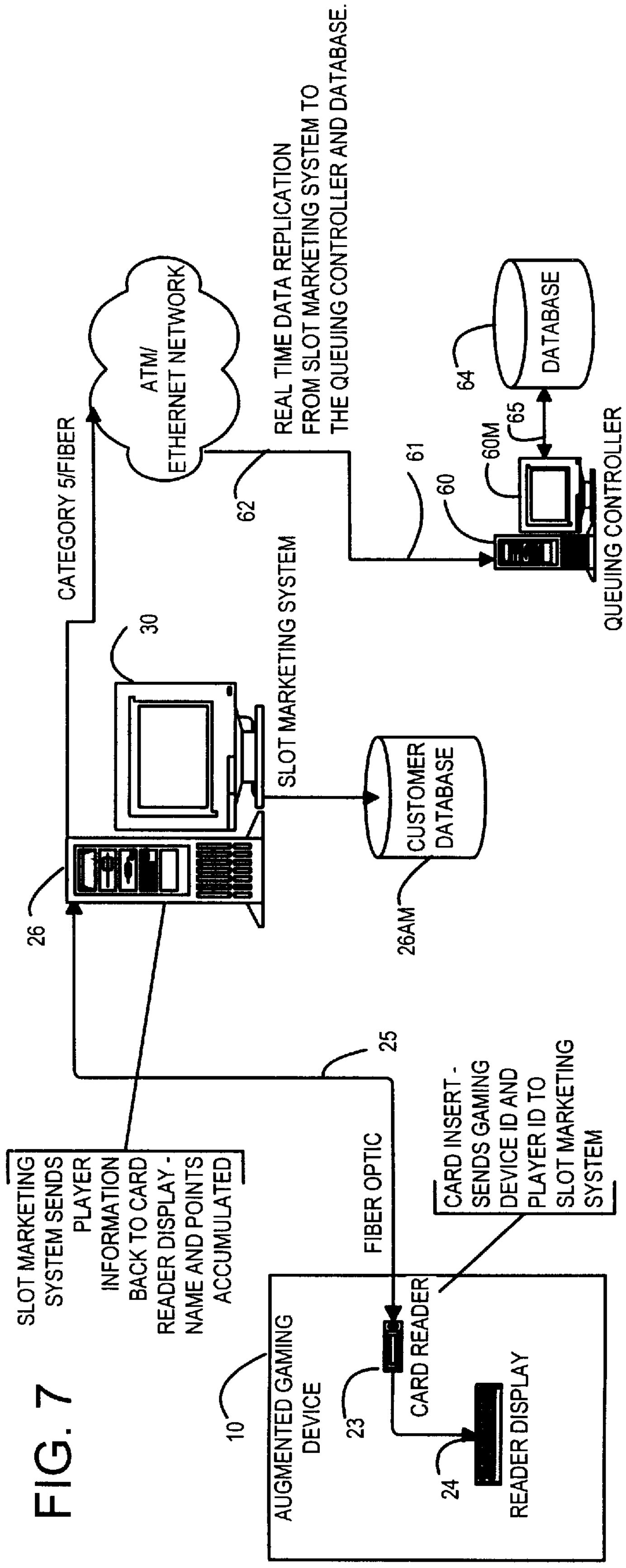
FIG. 7 is a block diagram of Player Card Interaction of the system of this invention.

Now refer to FIG. 7 for an explanation of the interaction of the system of FIG. 1 when the player introduces his slot card into the card reader 23. In one embodiment of this invention, player card identifies the player to the Slot Marketing System. The player must be a member of the Slot Club to take advantage of the Concierge. Card insertion sends gaming device ID and player ID to slot marketing system. As in the past, some data such as a greeting by name appears on the reader display 24 after identification of the player from the stored data on the player's card. At the same time the player identification (I.D.) and machine identification (I.D.) as well as coin in/coin out data are transmitted via lead 25 to the slot marketing system comprising the computer 26, its monitor 30 and its customer database stored in the computer 26 memory or associated memory device 26AM. Customer I.D., machine I.D. as well as player bonus status and actual play as it occurs is transmitted from the slot marketing system 26, 26AM and 30 to the queuing control and database for transfer and display on one of several concierge stations 40 of FIGS. 1 and 4 selected by the queuing controller 60. Slot marketing system sends player information back to card reader display 24—name and points accumulated. Real time data replication from IGT slot marketing system to the queuing controller and database. Player's card inserted will determine the player's location in the queuing controller 60. This will allow for tracking of the players location, initial greeting, promotions, call backs and player rankings. Jackpot notification will only include the machine number, from this a concierge can call the gaming device and congratulate the player even if player identification is not known. This will give a great opportunity to enroll other players in the slot club.

SYSTEM OPERATION

Figure 8:
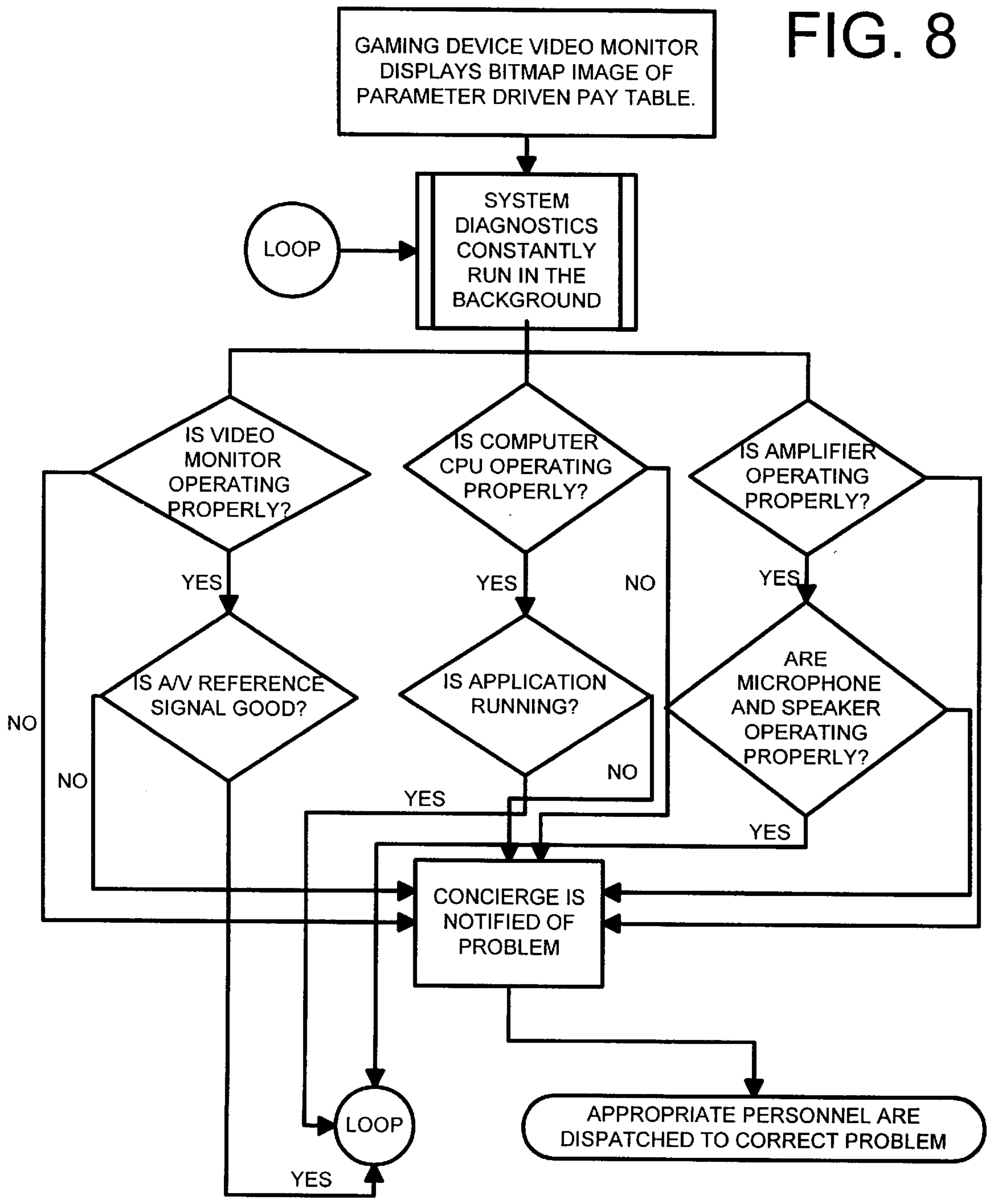
FIG. 8 is a flow diagram of the system of this invention during normal play of a gaming device.

The operation of the system is described in the flow diagrams, FIGS. 8–17, beginning with the normal play of the gaming device by non card club players without any use or access to the system. This is illustrated in FIG. 8. During such times and during periods of nonplay, the system is used for diagnostics in accordance with the sequences shown on FIG. 8. Even during such status, the concierge C will become aware of any machine malfunction and be able to dispatch appropriate personnel to correct the problem. Actual play of the gaming device is normally reported via the ICT coin in/coin out data source or via computer 12. This data may be used an displayed like other data on an available concierge's screen and she may great the player.

Figure 9:
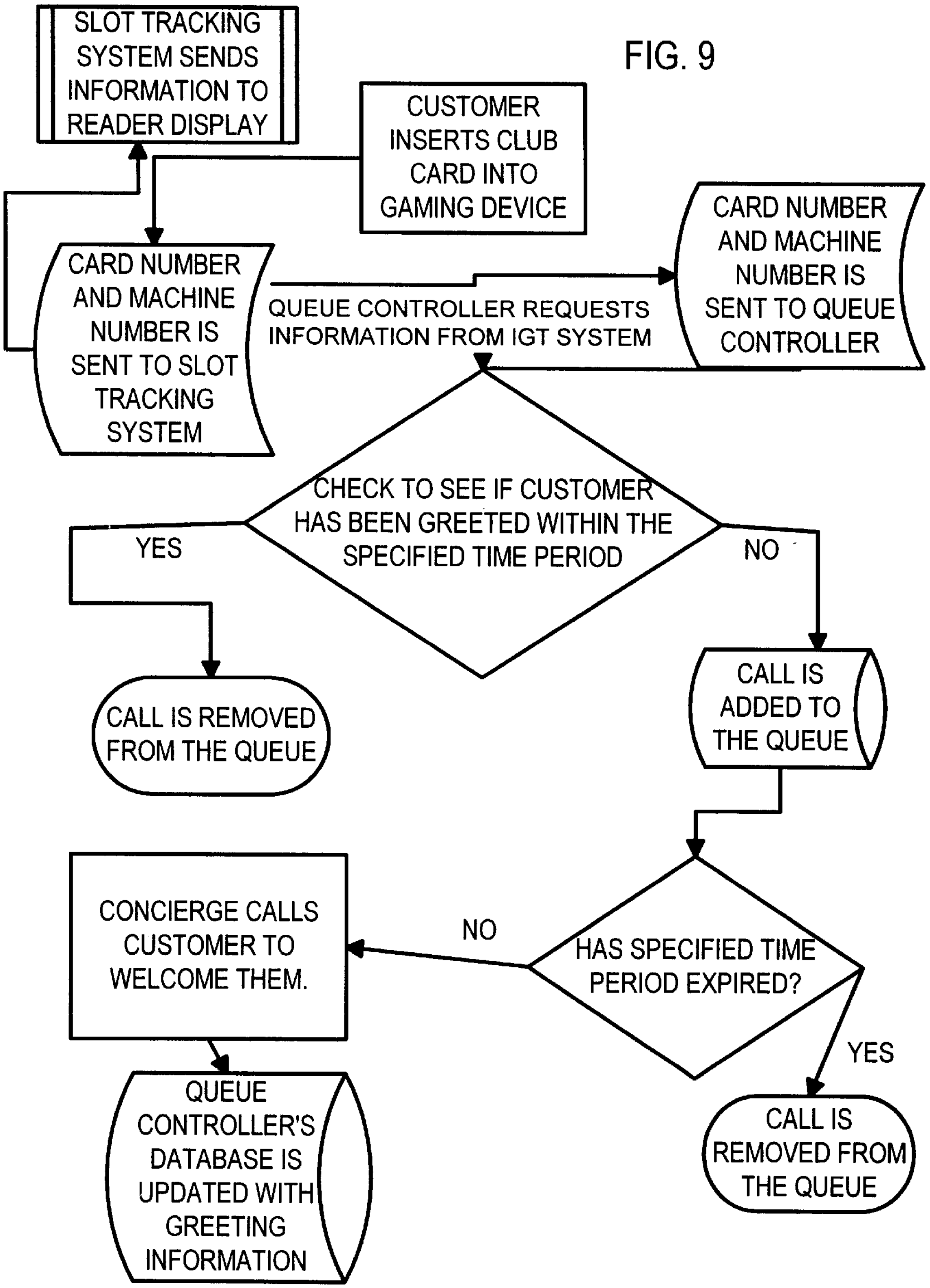
FIG. 9 is a flow diagram of the sequence of the system of FIG. 1 upon the insertion of a club card.
Figure 10:
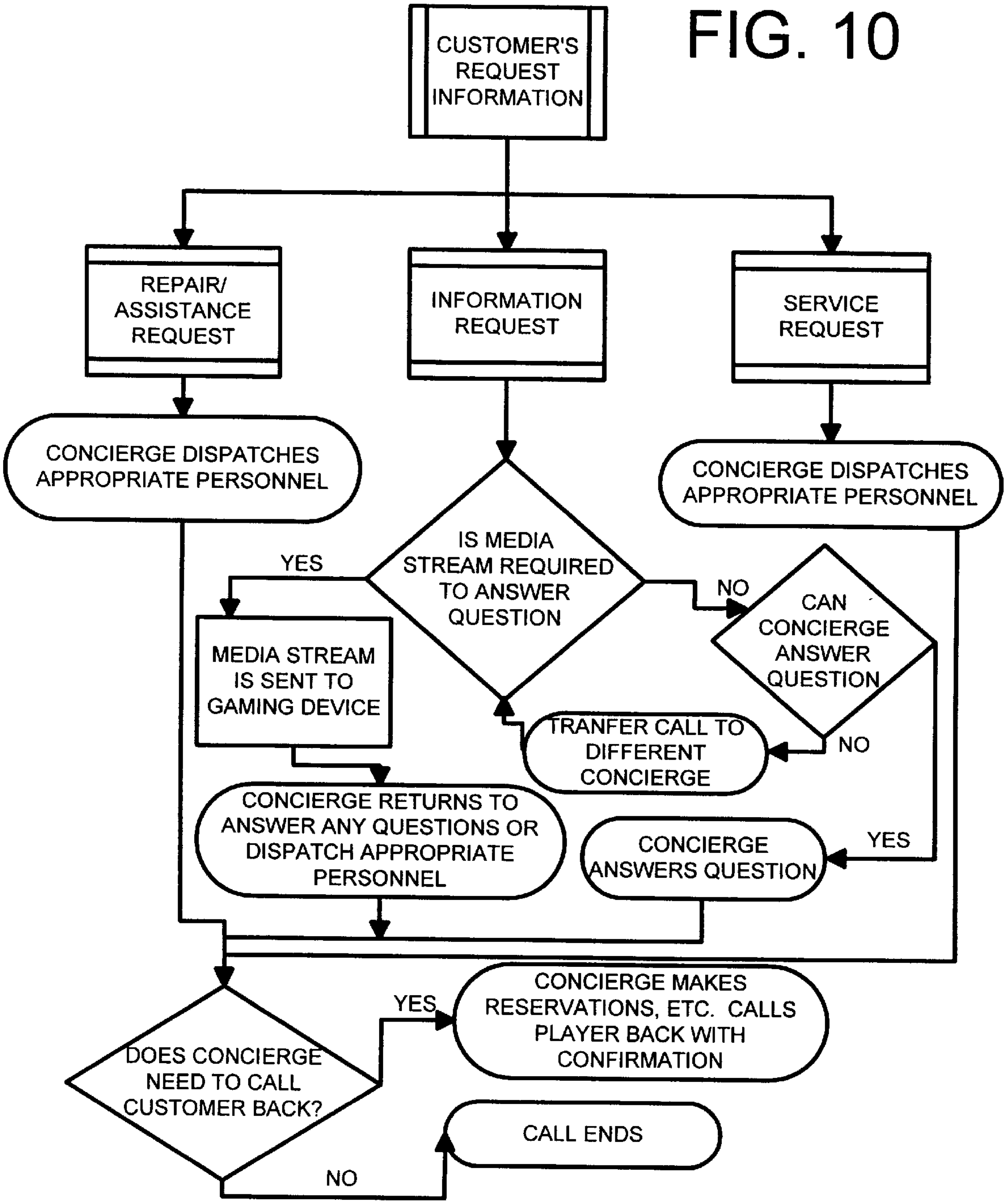
FIG. 10 is a flow diagram of a normal sequence of the system when in the conversation mode.
Figure 11:
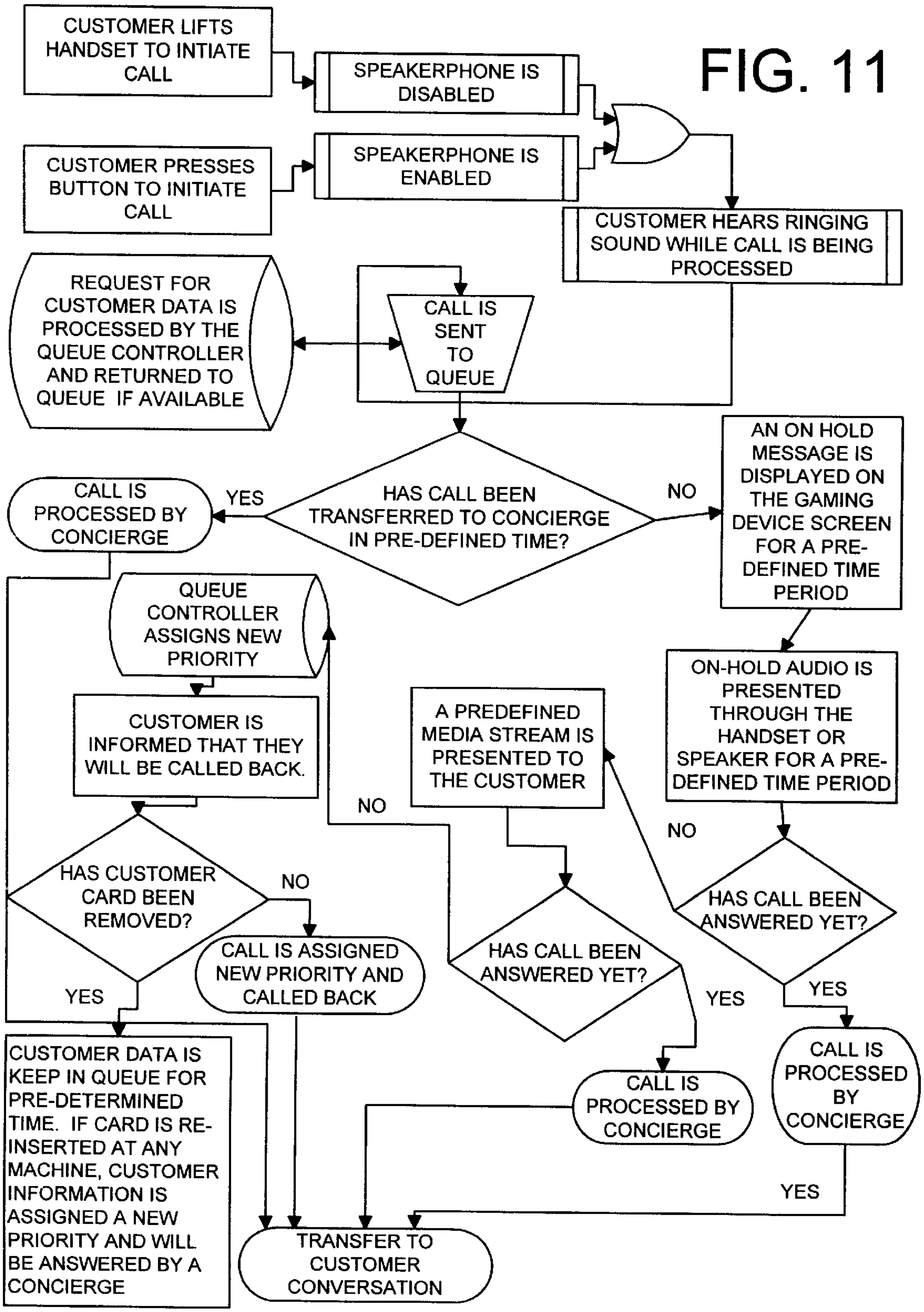
FIG. 11 is a flow diagram of the system of this invention when operation is initiated by the player lifting their handset or operating their call button.

Whenever a card club member inserts a card in the card slot of the reader 23 of FIGS. 1 and 2, the sequence of FIG. 9 proceeds to identify the player and the machine and also enters the player into the queuing system. This also triggers a realtime video and audio greeting from a concierge assigned by the queuing computer 60 from an available concierge. A typical customer conversation routine is disclosed in FIG. 10 whether a result of the initial greeting by the concierge C as in FIG. 9 or by the customer calling as illustrated in FIG. 11.

AUDIO/VIDEO OPERATION

The system is available in two modes of operation:

1. The one-way video allows customers to view the concierge, but not vice-versa. This provides a degree of personal privacy for the customer.

2. In full duplex audio and video mode of operation, the player and the concierge each views the other affording more lifelike direct communication. This may facilitate understanding of player's requests and provide a favorable customer reaction.

FIG. 20 illustrates mode 1 operation.

In FIG. 18, a typical pay table is displayed on the player's monitor 14 of FIGS. 1 and 2 during normal play. It is important in the normal play of the gaming device 17.

Whenever a concierge C is in communication with a player, the concierge image is superimposed upon a portion of the pay table of FIG. 18. Normally, the concierge's image will occupy a percentage of the screen, e.g., 20–25%. Such a view is shown in FIG. 19. The image is identifiable as a friendly human, ready to be of service to the player, but not dominating play.

Meanwhile, the concierge views their monitor 42 which displays player identification and information as well as the concierge's own image. This assures the concierge of presenting a favorable impression to the player. FIG. 20 shows such a concierge screen with the player's data on the right, the player's name and other pertinent information above the concierge's image. The nature of the communication is also identified. In FIG. 20, the concierge has called the player to give congratulation upon winning a jackpot.

In other types of calls, other information will be displayed. For example, if the player calls and requests show information, the concierge using the keyboard selects SHOWS and show information is displayed for her to view and advise the player.

In mode 2 operation, the player's image will appear, for example, side by side with the concierge's image.

NON CARD CLUB OPERATION

On occasion, the call button 20 will be operated or the handset lifted by the customer without any club card being inserted in the card reader 23. In such case, the routine set forth in FIG. 12 occurs. This action does not require concierge action, however, whenever a jackpot is won or coin in/coin out data reaches a set level in a period of time, the sequence of FIG. 13 proceeds whether a club card has been read or not. This provides an opportunity for the concierge to congratulate the identified card holder or in the case of a non card holder, to congratulate the unidentified player and to invite them to join the card club. FIG. 20 shows the concierge's C screen at such a time.

Figure 14:
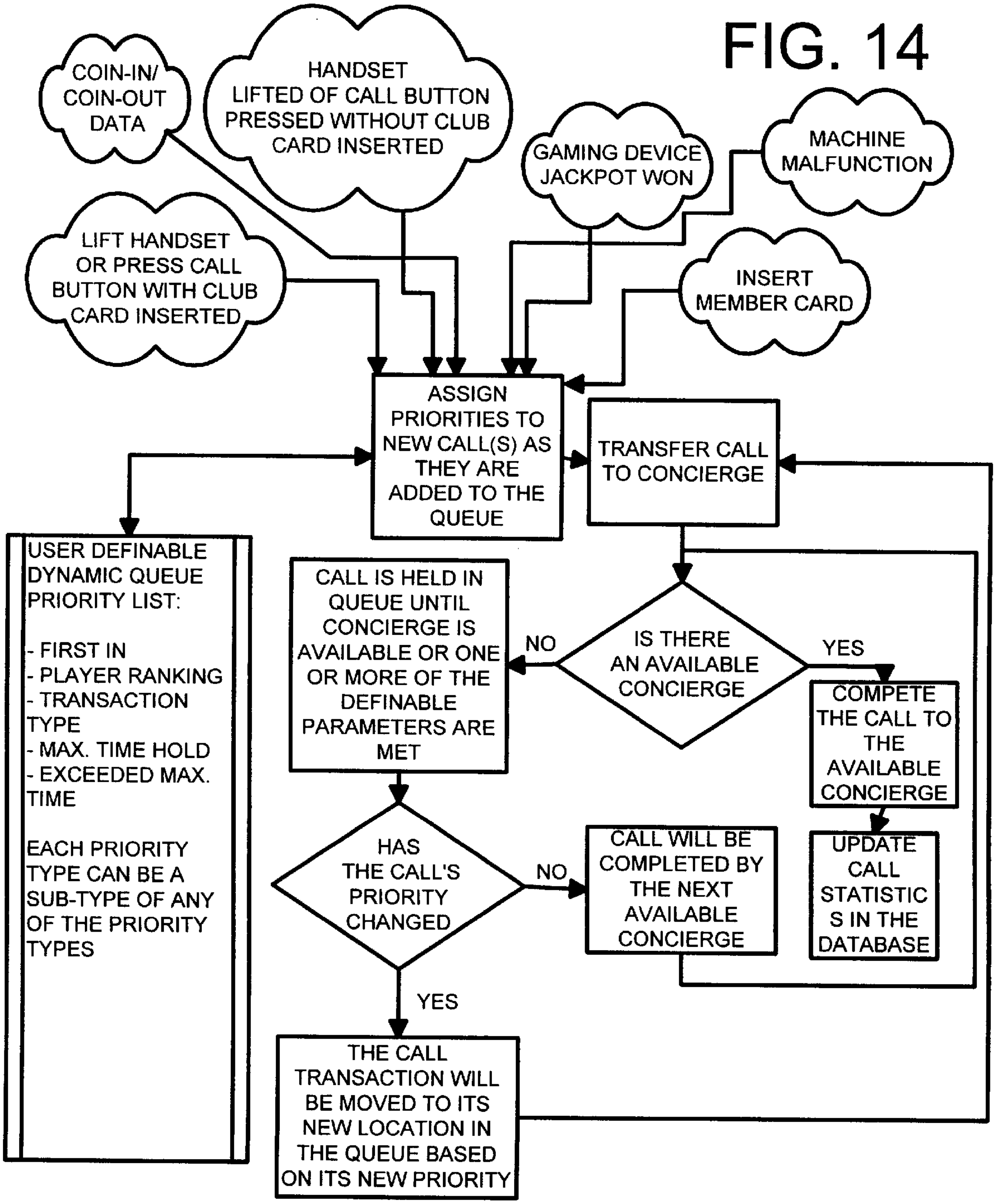
FIG. 14 is a flow diagram of the operation of the queuing system of this invention.

The queuing system operation in simplified form is shown in FIG. 14 and typical queuing priorities are identified above. These priorities may be changed at any time and they allow the preferred customers to be serviced first and any other occurrence such as a jackpot to be recognized instantly. Routine diagnostics during nonplay assume a lower priority to most other activities.

SUPERVISORY OPERATION

Figure 15:
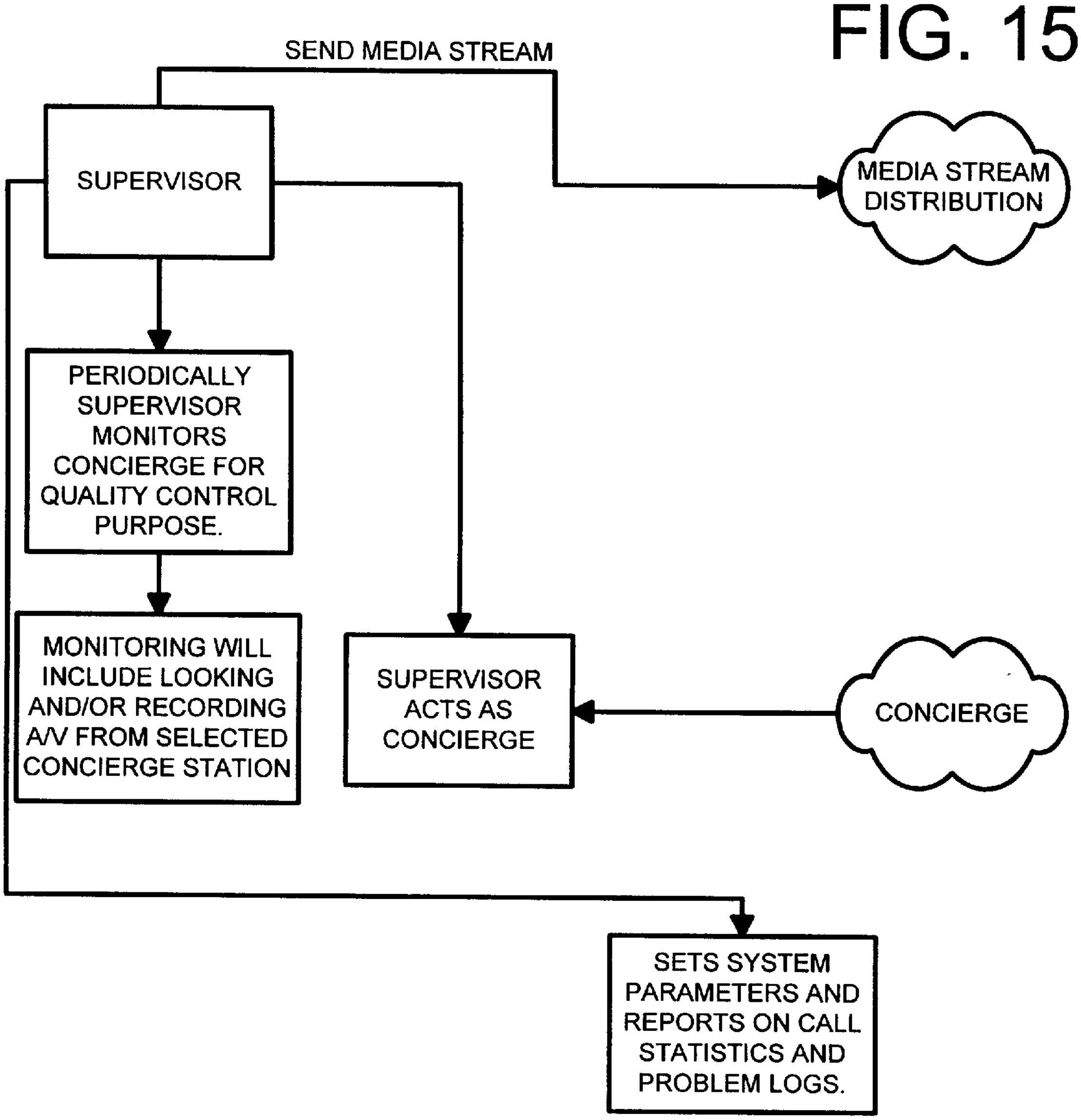
FIG. 15 is a flow diagram of the functions of the call center supervisor S interaction with the system.

On occasion, matters will come up which are beyond the scope or authority of the concierge and in such case a supervisor enters the system. This function is illustrated in FIG. 15. The supervisor assumes the role of concierge upon request of the operational concierge handling the call. During other periods the supervisor has access to any selected concierge line for quality control purposes. The supervisor can also broadcast a media stream to the gaming devices 10 as illustrated in FIG. 17.

During standby and normal play when the system is not in communication with a player, the pay table as illustrated in FIG. 18 is normally displayed on monitor 14 of FIGS. 1 and 2.

A typical view of a concierge at the player's station, gaming device 10 is illustrated in FIG. 19. The player will see the concierge C in part of the screen along with the pay table or other casino information of the type selected by the concierge, e.g., casino events, show times, reservation information, or the like.

QUEUE CONTROLLER

The operation of the queue controller of FIG. 1 is illustrated in FIG. 16. It involves updating the player's record whenever a jackpot is won and updating player information to any concierge serving the customer.

Calls are entered into the queuing order and assigned to different concierges in accordance with the highest priority matter taken up first. Typical priorities are as follows:

a. First in;

b. Player status, i.e., preferred player/standard player;

c. Longest hold time;

d. Call back player;

e. Jackpot;

f. Greeting when player card in inserted; or g. Coin in/coin out standard is met.

SYSTEM MAJOR FUNCTIONS

Major functions of our invention are as follows:

A. The system provides two-way audio and one-way video or two-way audio/video communications between the gaming device and the call center which is identified as the concierge service.

B. An interface is established between the slot marketing system equipped gaming device 10 and the queue controller 60. The slot marketing system includes a player I.D. game card, reader 23, and encoder of the particular gaming device into which the card is inserted. Player identification and machine identification data is transferred from the slot marketing system to the queue controller 60.

C. Customers who are card club members are instructed by their card participating literature and their club card to insert the club card into the gaming device reader 23 prior to initiating play on that particular machine 10. In sequence:
   1. The gaming device card reader 23 sends a card number and gaming device 10 number to the slot marketing system 26, 26AM and 30.
   2. The slot marketing system sends the card number and gaming device number to the queue controller 60.
   3. The queue controller 60 accesses the slot club database to determine if the customer has been greeted within the specific time period, e.g., 2 hours to 2 days.
      a. The queue controller 60 sends customer information to the call center by a queuing system.
      b. An available concierge C receives the information which is displayed on their screen and they call the customer with a welcome greeting and invitation to use the video system.
      c. The queue controller 60 database is updated to reflect the fact that the player is active at this time on this machine and to reflect that the customer has received a greeting.
      d. If the concierge does not respond within a preselected time period designated "X" seconds, then the customer is removed from the concierge's outgoing queue.
   4. The queue controller 60 maintains a list of which customers are at which gaming devices.

If the system is initiated by the customer lifting the handset or pressing the call button to initiate a call:
   1. The customer hears a ringing sound similar to a telephone call that is being processed;
   2. The call is sent to the queuing system.
   3. A request for customer information is sent to the queue controller 60. The interface server cross references who is at which specific gaming device and provides information to the queuing system.
   4. If a call is not transferred from the queuing system to a concierge station in the preselected time "X", then the following occurs:
      a. An "on hold" message is displayed on the gaming device video screen.
      b. An "on hold" audio message is delivered to the player via the handset or speaker.
      c. A video display is presented to the customer while they are on hold. This may include a variety of messages.
      d. The call is transferred to the next available concierge.
      e. If no concierge is available during the "X" time period or "X" media stream, then the following occurs:
         1. A call is transferred to the concierge's outgoing queue. That is a definable priority.
         2. Customer receives a message that they may hang-up and the next available concierge will call back.
         3. Customer is removed from concierge's outgoing queue when concierge calls customer back.
         4. If the player's club card is removed from the system before the concierge calls back, the customer stays in the concierge out-going queue for a user-definable time period, but is marked as inactive. When the customer inserts their card again, the customer is marked as active if still in the out-going queue. This will allow the system to follow the customer around the casino and call them back.

CUSTOMER AND CONCIERGE COMMUNICATIONS

The customer and concierge will typically have one of the following communications:

1. Service request from the player. The concierge will dispatch the appropriate personnel.
2. Information requested by the player results in the concierge answering questions and showing a video, if appropriate.
3. Repairs or assistance requested by the player. The concierge dispatches the appropriate personnel to the player and the machine.
4. Broadcast messages or videos are displayed to the players' monitors.
5. The concierge greets player when coin in/coin out data from a particular gaming device meets a preset standard.
6. The concierge congratulates the customer on a jackpot win.
7. A concierge may transfer a call to another concierge, if desirable.

Thereafter, the call is terminated and removed from the queue.

JACKPOT

When a jackpot is won by the card player, the following occurs:

A. The customer is placed in the concierge's outgoing queue with a designated priority.

B. The concierge calls the customer to congratulate them on the jackpot. This is illustrated in the flow diagram of FIG. 13 and screen displays of FIGS. 19, 20 and 20A.

HANDSET LIFTED WITHOUT CLUB CARD INSERTED

Figure 12:
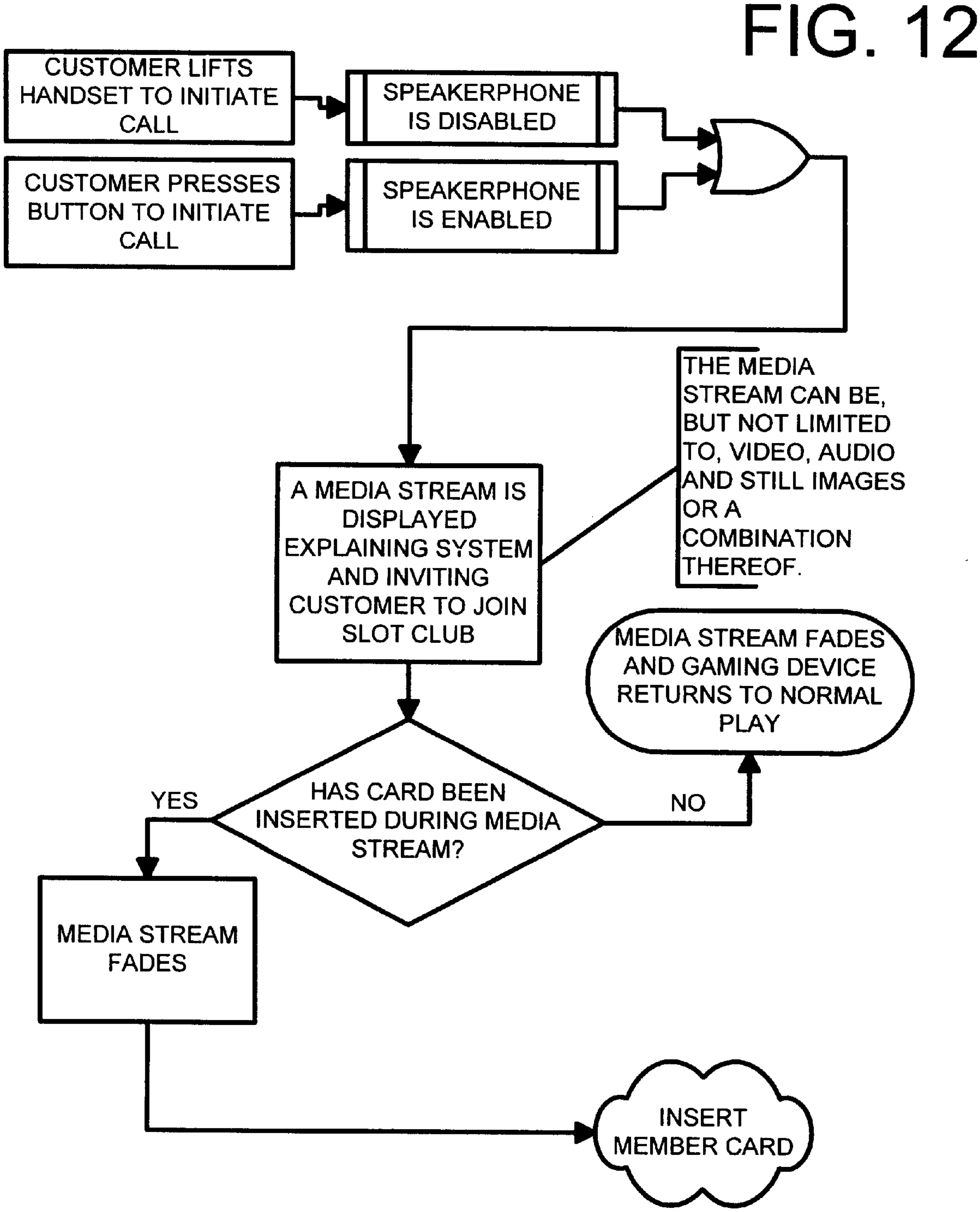
FIG. 12 is a flow diagram similar to FIG. 11 without a club card being inserted.
Figure 13:
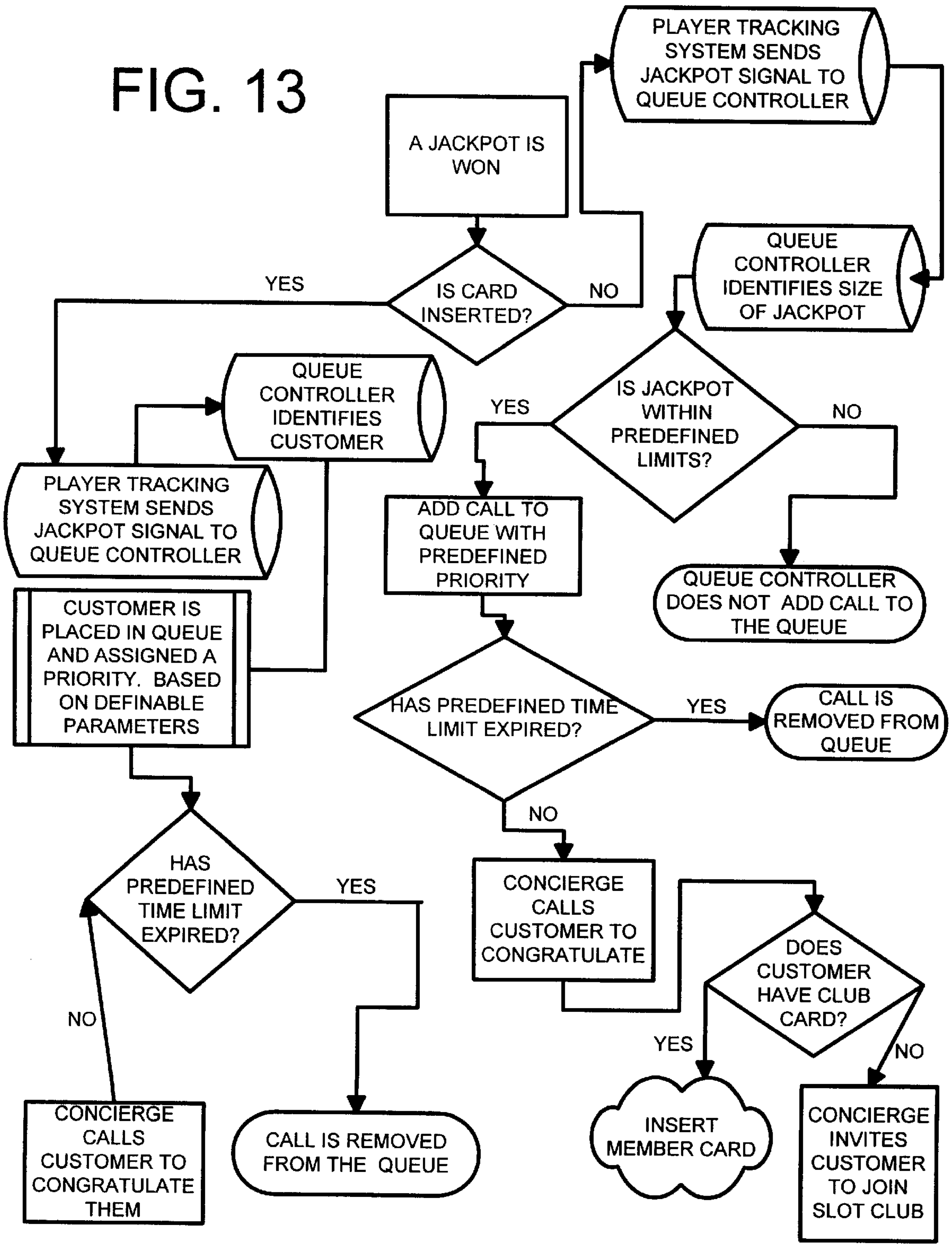
FIG. 13 is a flow diagram of the operation of the system during a jackpot win.

As illustrated in FIG. 12, if the handset is lifted or the call button pushed without the club card inserted, then:

A. A media stream is displayed inviting the customer to join the slot club. If the card is inserted during the media stream, then the media stream fades and is replaced either by the concierge or the queuing holding system.

B. The system resumes standby operation with respect to the calling machine.

At any time, the system has the capability to resize the player window display for various video sources. For example, a quarter page screen image of the concierge may be desired or a full screen may be used for a video promotion message. This is programmed into the system and as presently planned, not controlled by the concierge. A default image appears on the screen when the machine is not being played. The default message usually is a pay table for the gaming device. A typical pay table is illustrated in FIG. 18.

We have provided, for the first time, personal communications in audio/visual and data between a gaming device player and a host representative without interfering with game play. Communications with a human who knows the identity, preferences and requests of a customer is instantly available by the use of this system.

In implementing this invention, although other similar devices are available on the market, the following components are preferred:

| COMPONENT | MODEL | MANUFACTURER |
|---|---|---|
| card reader 23 | CRD-004A | International Gaming Technology (IGT), Reno, NV |
| reader display 24 | | International Gaming Technology (IGT), Reno, NV |
| local computer 12 | | |
| video interface module | VIM | C-Phone Corporation, Wilmington, NC |
| video overlay card | VTC | C-Phone Corporation, Wilmington, NC |
| IGT Slot System 26, 30 | | International Gaming Technology (IGT), Reno, NV |
| queuing computer 60 | Pentium class | |
| SQL Database 64 | SQL Server | Microsoft Corporation, Redmond, WA |
| media server 72 | Pentium class | |
| concierge computer 41 | Pentium class | Dell Computer Corp., Austin, TX |
| ATM/Ethernet 62 | | |

The above described embodiments of the present invention are merely descriptive of its principles and are not to be considered limiting. The scope of the present invention instead shall be determined from the scope of the following claims including their equivalents.

We claim:

1. A service and communication system in combination with an augmented gaming device comprising:

a concierge station manned by a live concierge, said concierge station including:
- a video camera;
- a video monitor;
- a microphone;
- an audio receiver;
- switching means controlled by a concierge at said station;
- means for accessing a computer data bank storing at least one of the following:
  - player data;
  - gaming device data;
  - services available to the player;

an augmented gaming device including:
- a signalling device for signalling to the concierge station;
- a microphone;
- audio receiver means;
- a video monitor; and
- memory means for storing augmented gaming device information;
- said video monitor normally displaying augmented gaming device information from said memory means; and a control station including;
- computer means for storing at least one of the following:
  - player data received from said player recognition means;
  - services available to players;
  - gaming device identification;
  - gaming device status; and
  - concierge station status;
- switching means for selective connecting said augmented gaming device to said concierge station;

a two way audio communications link between said control station and said augmented gaming device microphone and audio receiver;

a two way audio communications link between said control station and said concierge station microphone and audio receiver;

means for selectively connecting said two way audio communications link together for communication between said concierge station and said augmented gaming device;

a data communications link between said augmented gaming device and said control station for communicating augmented gaming device play data to said control station;

means for selectively connecting said concierge station video camera to the augmented gaming device video monitor to display the image of the live concierge at said concierge station on the monitor of the augmented gaming device in place of the normal gaming device information.

2. A service and communication system in accordance with claim 1 including means coupling said concierge station video camera to said concierge station monitor to display the image of the concierge at least when the concierge station is in communication with an augmented gaming station.

3. A service and communication system in accordance with claim 1 wherein said augmented gaming device includes player recognition means and said system includes computer means for storing player data and including means coupling said concierge station monitor to said computer means for displaying player information corresponding to the player identified by said player recognition means.

4. A service and communication system in accordance with claim 3 including monitor control means for simultaneously displaying the player data and concierge image on said concierge station video monitor.

5. A service and communication system in accordance with claim 1 including player identification means assigned to a player and said augmented gaming device includes means for reading said player identification means and for transmitting a player identification signal to said control station.

6. A service and communication system in accordance with claim 1 including means for selectively communicating augmented gaming device play data from said augmented gaming device to said concierge station indicative of winning play of a selective level.

7. The service and communication system in accordance with claim 1 including a plurality of augmented gaming devices each in communications link with said control station;

a plurality of concierge stations; and switching means at said control station for selectively connections any of said augmented gaming devices to any of said concierge stations.

8. A service and communication system in accordance with claim 7 including queuing means for storing machine identification from each augmented gaming device upon detection of player identification data received in the order of detection;

said queuing means operating to identify concierge stations available to service the player identified and including means for connecting an available concierge station to the earliest detected player's augmented gaming device.

9. A service and communication system in accordance with claim 8 wherein said queuing means includes a prioritization schedule and connects each identified player's augmented gaming device to a concierge station in accordance with the prioritization schedule.

10. A service and communication system in accordance with claim 8 wherein said queuing system is operative to direct the display of substitute video display at the augmented gaming device in the absence of an available concierge station.

11. A service and communication system in accordance with claim 1 wherein said control station includes means for detecting winning play at an augmented gaming device above a selected level and for connecting a concierge station to said augmented gaming device regardless of the detection of player recognition data from said augmented gaming device.

12. A concierge system for communication with players of an augmented gaming devices having a player data encoded card reader comprising:

a plurality of augmented gaming devices each located at a remote location from said concierge station and including in addition to a gaming device:

a video screen;

an audio receiver;

a microphone; and card controlled means for establishing communications with a concierge station;

said card controlled means responding to coded information on the player's card to identify the player actuating said card controlled means;

a concierge station including:

a video camera for viewing a live concierge;

a microphone;

a video monitor;

an audio receiver;

a communications link between said concierge station and each augmented gaming device; and control means operable by a concierge to initiate communications between the concierge station and the video monitor, the microphone and the audio receiver of the augmented gaming device while displaying the live concierge image at said augmented gaming device transmitted over said communication link.

13. A concierge system in accordance with claim 12 including means responsive to the detection of a player data encoded card by said card controlled means for displaying selected data from said card on the monitor at the concierge station.

14. A concierge system in accordance with claim 13 including memory means for storing additional player data to that stored on the player data encoded card and wherein said connecting means initiates display of additional player data at the video monitor of the concierge station.

15. A concierge system in accordance with claim 12 wherein a plurality of concierge stations are present and including means for selectively connecting a particular concierge station to respond to a selected augmented gaming device.

16. A concierge system in accordance with claim 12 wherein said two way communications link between said concierge station and each augmented gaming device includes a two way audio communications channel and a one way video channel from said concierge station to said augmented gaming device.

17. A concierge system in accordance with claim 12 wherein said communications link includes a two way audio channel and a two way video channel between said augmented gaming device and said concierge station.

18. A concierge system in accordance with claim 12 wherein said communications link include a diagnostic fault detection communications channel for communication diagnostic fault detection information from said augmented gaming device to said concierge station.

19. A concierge system in accordance with claim 12 wherein said concierge station includes means for connecting the augmented gaming device's microphone and receiver to a telephone system.

20. A concierge system in accordance with claim 12 wherein said augmented gaming device includes means for sensing a jackpot win by the player and means for signalling the concierge station of the augmented gaming device identification and the jackpot win independent of any operations of said card controlled means sensing a player card.

21. A concierge system in accordance with claim 12 wherein said augmented gaming device includes gaming device identification and said card controlled means encodes player identification for transmission over said communications link with player card identification.

22. A communication system in combination with a slot machine including a pay table display, player actuated play controls, a game result display and winning payout means, said communications system comprises;

a card reader for reading a card encoded with player data;

a video display;

memory means for storing the pay table;

said video display coupled to said memory means for selectively displaying the pay table;

said video display additionally coupled to a communication link for receiving video displays received over the communications link;

a concierge station including:

a microphone;

an audio receiver;

a video camera;

said microphone and audio receiver coupled to said communications link for two way audio communication with a remote station;

player controlled signalling means for initiating contact with said over said audio communications link; and means for switching said video display from displaying the pay table to display live video from said concierge over said video communications link.

23. A communication system in accordance with claim 22 including a plurality of concierge stations and means for selectively switching different slot machines to different concierge stations.

24. A communication system in accordance with claim 22 including a plurality of video sources and means for selectively switching different video sources with the pay table display at said video machines.

25. A communication system in accordance with claim 22 including means controlled by said concierge station for selectively communicating with selected slot machines responsive to the detection of at least one of the following:

a slot machine malfunction;

a jackpot win; or a selected level of slot machine coin in/coin out play.

* * * * *